(12) United States Patent
Amano

(10) Patent No.: US 8,462,260 B2
(45) Date of Patent: Jun. 11, 2013

(54) IMAGE PICKUP APPARATUS AND IMAGE PICKUP METHOD

(75) Inventor: Ryosuke Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 12/837,663

(22) Filed: Jul. 16, 2010

(65) Prior Publication Data

US 2011/0019071 A1 Jan. 27, 2011

(30) Foreign Application Priority Data

Jul. 23, 2009 (JP) ................ P2009-172384

(51) Int. Cl.
H04N 5/238 (2006.01)
H04N 5/225 (2006.01)

(52) U.S. Cl.
USPC .......................... 348/363; 348/304

(58) Field of Classification Search
USPC ......... 348/362, 308, 363, 320, 321, 302–305, 348/312, 311, 294, 281, 315–319, 222.1, 348/446, 550, 551
See application file for complete search history.

(56) References Cited

U.S. PATENT DOCUMENTS

| 7,375,672 | B2 | 5/2008 | Muramatsu et al. |
| 8,242,426 | B2 * | 8/2012 | Ward et al. ............... 250/208.1 |
| 2005/0206757 | A1 * | 9/2005 | Itoh ............................ 348/294 |
| 2009/0034954 | A1 * | 2/2009 | Kubota et al. ............... 396/121 |
| 2009/0190020 | A1 * | 7/2009 | Gomi et al. .................. 348/308 |

FOREIGN PATENT DOCUMENTS

| JP | 2005 323331 | 11/2005 |
| JP | 2008 160438 | 7/2008 |

* cited by examiner

*Primary Examiner* — Chieh M Fan
*Assistant Examiner* — Ahmed A Berhan
(74) *Attorney, Agent, or Firm* — Frommer Lawrence & Haug LLP; William S. Frommer; Ellen Marcie Emas

(57) ABSTRACT

An image pickup apparatus includes a pixel unit divided into at least two regions which generates pixel signals, driving controllers which controls reading of the pixel signals from the regions, a storage unit storing pixel signals for one screen, a timing controller controlling a timing when the pixel signals are read from the storage unit based on a setting value of an input frame rate, and a timing generator which generates a driving signal for performing the reading processes of the pixel signals the regions in parallel in terms of time when the frame rate is larger than a predetermined threshold value and generates a driving signal for performing the reading processes of the pixel signals from the regions in series in terms of time when the frame rate is not larger than the predetermined threshold value, and which supplies the generated driving signal to the driving controllers.

10 Claims, 18 Drawing Sheets

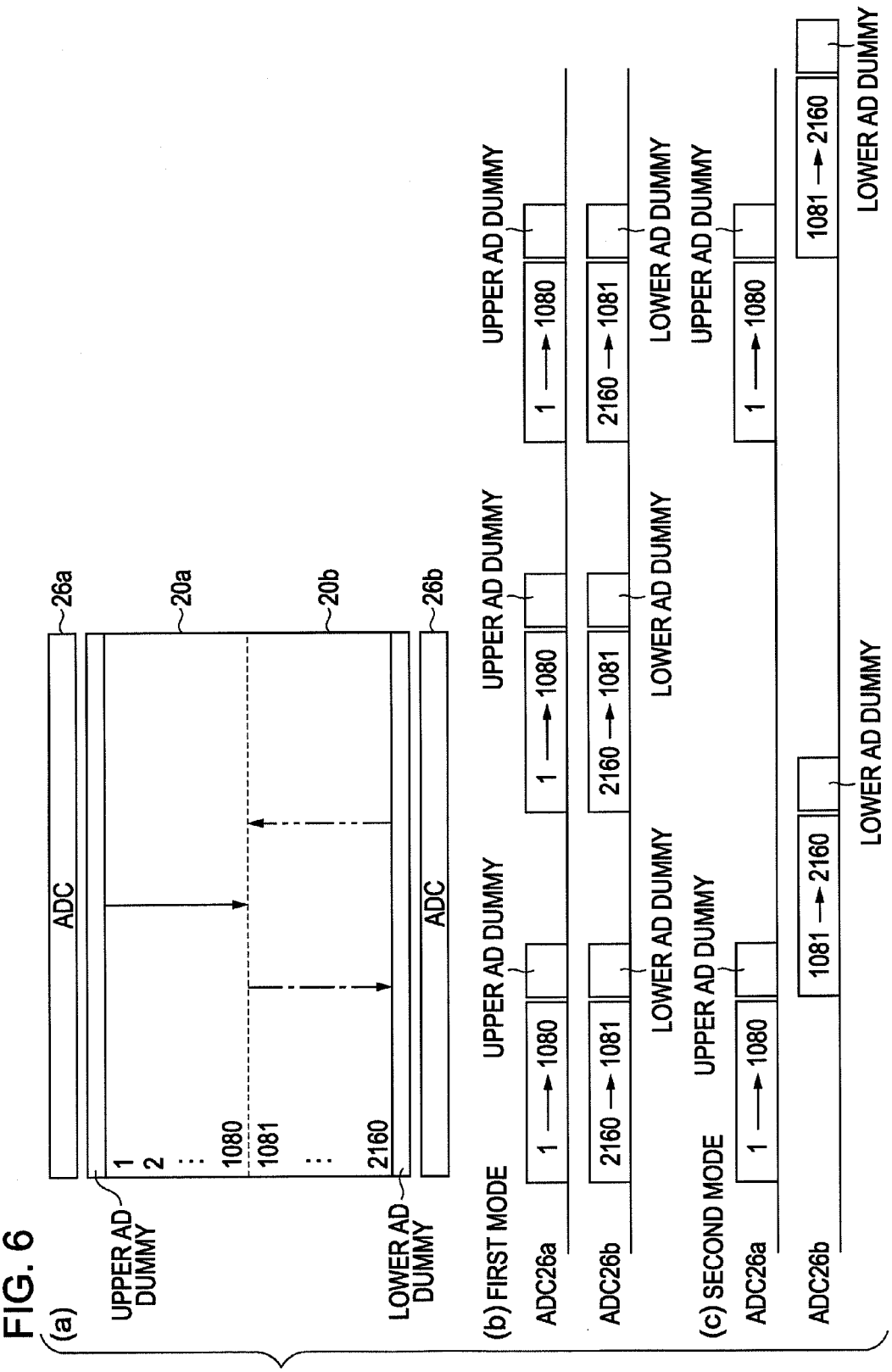

FIG. 9

| | STARTING COUNTER | STARTING PIXEL ROW | THE NUMBER OF READING ROWS | READING DIRECTION |
|---|---|---|---|---|
| UPPER AD/BLOCK 1 | | | | |
| UPPER AD/BLOCK 2 | | | | |
| LOWER AD/BLOCK 1 | | | | |
| LOWER AD/BLOCK 2 | | | | |

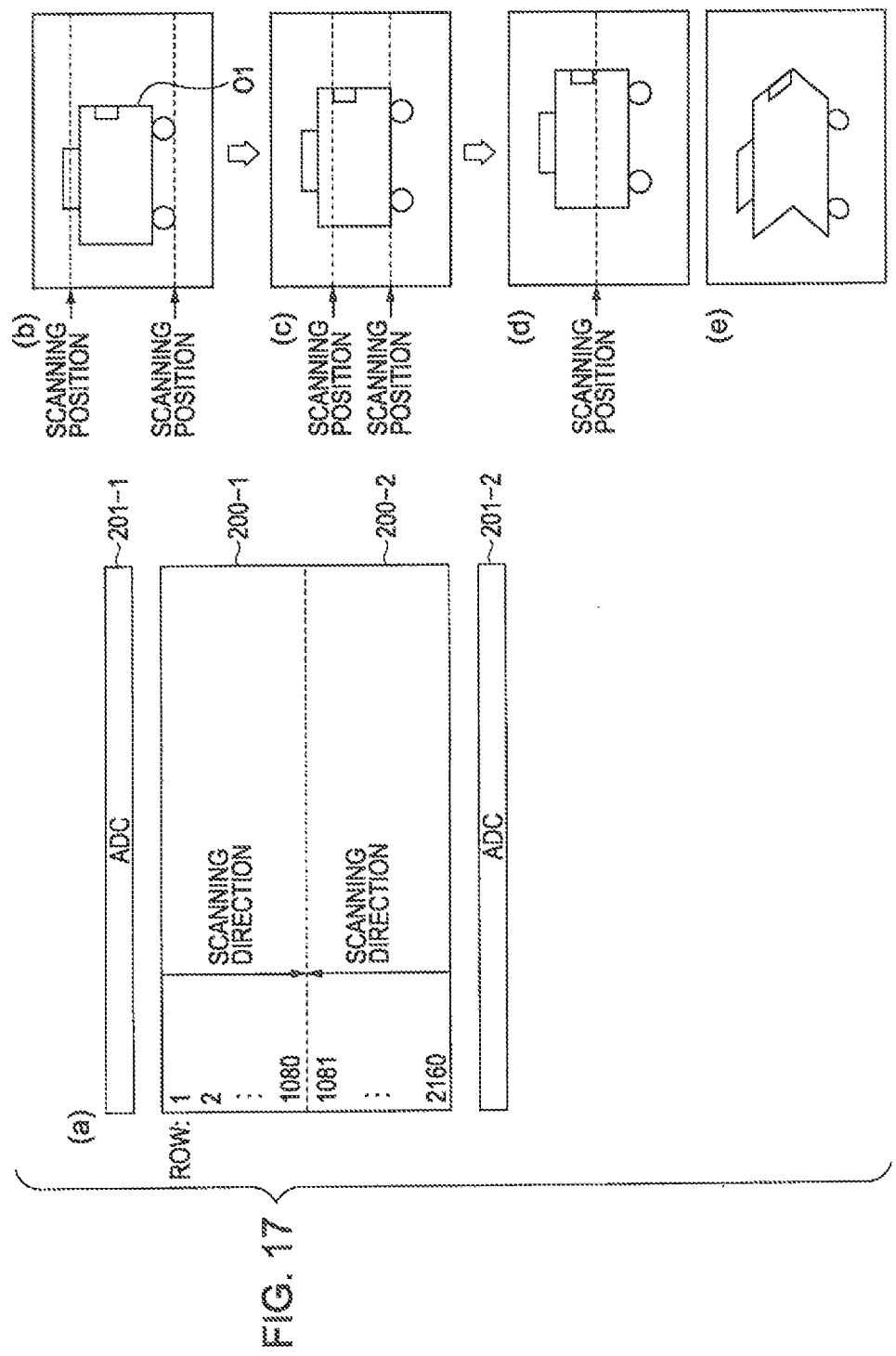

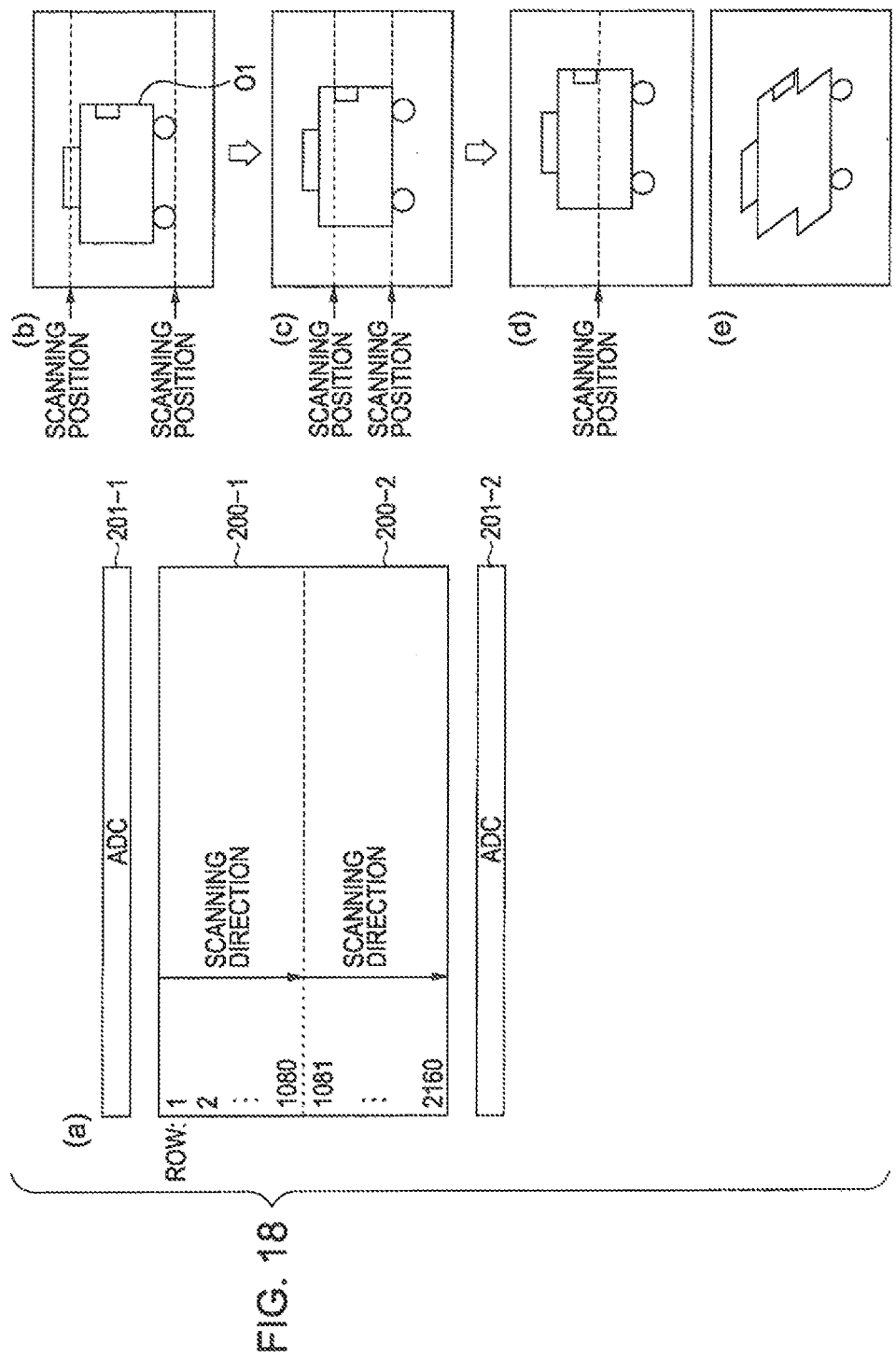

IMAGE PICKUP APPARATUS AND IMAGE PICKUP METHOD

BACKGROUND OF THE INVENTION

1. Field of the Invention

The present invention relates to an image pickup apparatus including an image sensor employing a method for shifting timings of exposure in an image area in a screen and an image pickup method.

2. Description of the Related Art

In general, a method for dividing an image area (pixel portion) into a plurality of regions and reading pixels included in the individual regions is used as a method for attaining high-speed reading performed by CMOS (Complementary Metal Oxide Semiconductor) image sensors (refer to Japanese Unexamined Patent Application Publication Nos. 2005-323331 and 2008-160438). Japanese Unexamined Patent Application Publication No. 2008-160438 discloses a technique of dividing an image area into two regions and reading pixels included in the individual regions.

SUMMARY OF THE INVENTION

However, there arises a problem in that when an image sensor in which pixels restart storage of charges when outputting image signals is used, timings when exposure is performed on individual regions of an image area in a screen are shifted from each other. Accordingly, distortion (rolling distortion) may occur in an image obtained by capturing a moving object.

A case where image signals obtained from pixels included in an image area 200 having 2160 rows are sequentially read (scanned) from the first row to the 2160th row is taken as an example as shown in (a) of FIG. 16. ADCs 201 corresponding to pixel columns in the image area 200 is disposed on an upper side of the image area 200. Note that, although only one ADC 201 is shown in (a) of FIG. 16, a plurality of ADC 201 are practically disposed so as to correspond to a number of pixel columns.

It is assumed that the image area 200 is scanned in this configuration and an object O1 moves from left to right with time as shown in (b) to (d) of FIG. 16. In this case, an image finally obtained is distorted as shown in (e) of FIG. 16. That is, a picture which corresponds to the object O1 and which has vertical lines tilted leftward is generated.

When a method for dividing an image area into regions and reading pixels included in the individual regions is employed, this rolling distortion remarkably occurs. It is assumed that, as shown in (a) of FIG. 17, an image area 200 is divided into upper and lower regions 200-1 and 200-2 and the upper region 200-1 is scanned from top to bottom and the lower region 200-2 is scanned from bottom to top. As shown in (a) of FIG. 17, ADCs 201-1 perform AD conversion on pixel signals obtained from the upper region 200-1 and ADCs 201-2 perform AD conversion on pixels obtained from the lower region 201-2.

That is, a reading process performed on the region 200-1 and a reading process performed on the region 200-2 are simultaneously started from the first row included in the upper region 200-1 and the 2160-th row included in the lower region 200-2, respectively. Then, a timing when the 1080th row is finished reading and a timing when the 1081st row is finished reading coincide with each other.

It is assumed that the image area 200 is scanned in this configuration and an object O1 moves from left to right with time as shown in (b) to (d) of FIG. 17. In this case, an image finally obtained is distorted as shown in (e) of FIG. 17. That is, a picture which corresponds to the object O1 and which has vertical lines tilted leftward in the upper half and tilted rightward in the lower half is generated.

Also in a case where an upper region 200-1 and a lower region 200-2 are read from top to bottom as shown in FIG. 18, the rolling distortion occurs. As with the cases of FIGS. 16 and 17, when an object O1 moves from left to right in a screen, an image finally obtained is distorted such that vertical lines of the object O1 are tilted leftward in the upper and lower regions 200-1 and 200-2 as shown in (e) of FIG. 18. That is, a picture corresponding to the image has zigzag vertical lines.

That is, as shown in FIGS. 17 to 18, when the image area 200 is divided into the plurality of regions and the individual regions are subjected to the reading processes, high-speed reading is attained. However, the rolling distortion occurs in an image finally obtained. On the other hand, as shown in FIG. 16, when the image area 200 is sequentially scanned from top to bottom, a period of time used for the reading process is not reduced. However, the rolling distortion is relatively suppressed.

In generally-used image sensors, a reading direction of an image area 200 and the number of regions obtained through division of the image area 200 may be changed. However, there arises a problem in that selection between an advantage of high-speed reading and an advantage of reduction of the rolling distortion may not be performed.

The present invention has been made in view of the above problems and it is desirable to select one of two modes which have different advantages when an image sensor in which timings of exposure in a screen are not synchronized with each other is used.

According to the embodiment of the present invention, there is provided an image pickup apparatus including a pixel unit which generates pixel signals by performing photoelectric conversion on image light of an object which is entered through a lens and which is divided into at least two regions, an image pickup element controller which controls a start of reading of the pixel signals from the pixel unit, driving controllers which are disposed so as to correspond to the divided regions in the pixel unit and which controls reading of the pixel signals from the regions, a storage unit which stores pixel signals for one screen which have been output from the pixels, and a timing controller which controls a timing when the pixel signals are read from the storage unit in accordance with a setting value of an input frame rate. With this configuration, the reading of the pixel signals from one of the regions of the pixel unit and the reading of the pixel signals from the other of the regions are performed in parallel in terms of time when the frame rate is larger than a predetermined threshold value. On the other hand, the reading of the pixel signals from one of the regions of the pixel unit and the reading of the pixel signals from the other of the regions are performed in series in terms of time when the frame rate is equal to or smaller than the predetermined threshold value.

With this configuration, a mode in which the reading of the pixel signals from one of the regions of the pixel unit and the reading of the pixel signals from the other of the regions of the pixel unit are performed in parallel in terms of time and a mode in which the reading of the pixel signals from one of the regions of the pixel unit and the reading of the pixel signals from the other of the regions of the pixel unit are performed in series in terms of time are automatically switched from one to another. That is, one of the two modes having different advantages is selectively used.

BRIEF DESCRIPTION OF THE DRAWINGS

FIGS. 4A to 4D illustrate examples of the relationship between a rotation speed of the rotary shutter and a light-shielding timing or an exposure timing at positions in the image area according to the embodiment of the present invention, wherein FIG. 4A illustrates the relationship between the rotation speed of the rotary shutter and light-shielding timings or exposure timings at positions in the image area when "a=0" is satisfied, FIG. 4B illustrates an example of the positional relationship between the rotary shutter and an image pickup element which satisfies "a=0", FIG. 4C illustrates the relationship between the rotation speed of the rotary shutter and light-shielding timings or exposure timings at positions in the image area when "a=0.5" is satisfied, and FIG. 4D illustrates an example of the positional relationship between the rotary shutter and the image pickup element which satisfies "a=0.5";

FIGS. 5A to 5C show diagrams illustrating the relationships between a light-shielding time of the image area and an image-area reading time of the rotary shutter according to the embodiment of the present invention, wherein FIG. 5A illustrates a case where FPS is equal to 60 P, FIG. 5B illustrates a case where the FPS is equal to 24 P, and FIG. 5C illustrates a case where the FPS is equal to 8 P;

FIG. 6 shows examples of division of the image area according to the embodiment of the present invention, wherein (a) of FIG. 6 illustrates divided regions, (b) of FIG. 6 illustrates a method for reading the image area in a first mode, and (c) of FIG. 6 illustrates a method for reading the image area in a second mode;

FIG. 9 is a diagram illustrating a configuration of a register according to the embodiment of the present invention;

FIG. 17 shows diagrams illustrating generation of rolling distortion when an image area divided into upper and lower regions is scanned such that the upper region is scanned from top to bottom and the lower region is scanned from bottom to top according to the related art, wherein (a) of FIG. 17 illustrates a scanning direction of the image area, (b) to (d) of FIG. 17 illustrate transition of a position of an object in accordance with shift of a scanning position, and (e) of FIG. 17 illustrates the rolling distortion generated in a finally-obtained image; and FIG. 18 shows diagrams illustrating generation of rolling distortion when an image area divided into upper and lower regions is scanned such that the upper and lower regions are individually scanned from top to bottom according to the related art, wherein (a) of FIG. 18 illustrates a scanning direction of the image area, (b) to (d) of FIG. 18 illustrate transition of a position of an object in accordance with shift of a scanning position, and (e) of FIG. 18 illustrates the rolling distortion generated in a finally-obtained image.

DESCRIPTION OF THE PREFERRED EMBODIMENTS

An embodiment of the present invention (hereinafter referred to as "this embodiment") will be described hereinafter with reference to the accompanying drawings. An image pickup apparatus of this embodiment is configured such that a frame rate (Frame Per Second; hereinafter referred to as "FPS") is arbitrarily set and exposure timings in a screen is controlled to be fixed using a mechanical rotation shutter. Although the case where the rotary shutter is employed as the mechanical rotation shutter is taken as an example in this embodiment, other shutters such as a focal plane shutter may be used.

Furthermore, the image pickup apparatus of this embodiment selects a first mode in which first priority is given to high-speed reading of pixel signals or a second mode in which first priority is given to reduction of rolling distortion in accordance with a speed of scanning of the rotary shutter performed on the image area.

Note that description will be made in an order below.
1. Example of Entire Configuration of Image Pickup Apparatus
2. Relationship between Rotation Speed of Rotary Shutter and Rolling Distortion
3. Brief Description of First and Second Modes
4. Detailed Descriptions of Methods for Realizing First and Second Modes (Example of Configurations of Image Pickup Element and Timing Generation Circuit in Image Pickup Element)
5. Examples of Detailed Settings of First and Second Modes
6. Modification 1. Example of Entire Configuration of Image Pickup Apparatus First, referring to FIGS. 1 and 2, an example of an entire configuration of the image pickup apparatus of this embodiment will be described. Here, a configuration for realizing control of exposure timings using the rotary shutter is mainly described, and concrete methods for realizing the first and second modes are described later with reference to FIG. 3 and subsequent drawings. Note that, in this embodiment, when the second mode in which the first priority is given to the reduction of the rolling distortion is selected, the control of exposure timings using a rotary shutter 3 is not performed.

Figure 1:
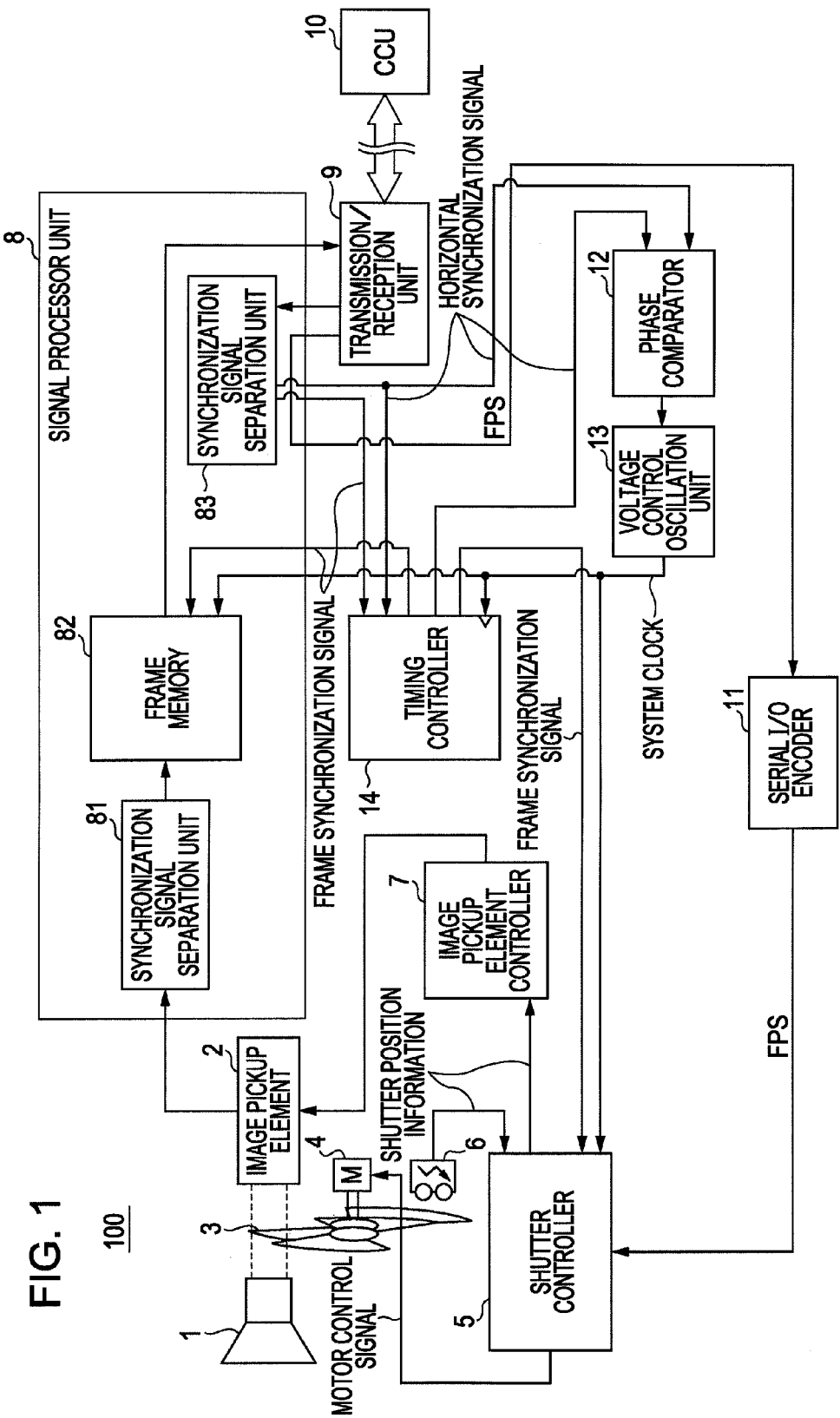
FIG. 1 is a block diagram illustrating an internal configuration of an image pickup apparatus according to an embodiment of the present invention.

FIG. 1 is a diagram illustrating a configuration of an image pickup apparatus 100 according to this embodiment. The image pickup apparatus 100 is connected to a camera control unit 10 (hereinafter referred to as a "CCU 10"). Video signals and control signals are transmitted and received between the image pickup apparatus 100 and the CCU 10 in accordance with the standard of HD-SDI (High Definition-Serial Digital Interface).

The CCU 10 transmits a synchronization signal to the image pickup apparatus 100. In accordance with the synchronization signal, a frame synchronization frequency of the image pickup apparatus 100 is determined. The frame synchronization frequency used in the image pickup apparatus 100 is identically used in a recording/reproducing apparatus (not shown) and a display apparatus (not shown) which are connected to the image pickup apparatus 100.

The CCU 10 further transmits information on the FPS which determines a shooting interval of an image pickup element 2 to the image pickup apparatus 100. When the frame synchronization frequency is denoted by "P_F", the relationship between the frame synchronization frequency P_F and the FPS is expressed as below.

$$P\_F \geq FPS$$

For example, when a maximum driving speed of the image pickup element 2 of the image pickup apparatus 100 is 240 P (240 frames/s progressive), the frame synchronization frequency is set to 240 P. In this case, an arbitrary value within a range from 1 P to 240 P is set as the FPS by a user. The relationship between the frame synchronization frequency P_F and the video signal may be fixed so as to attain the fixed phase relationship only when the frame synchronization frequency P_F is equal to the value of the FPS and otherwise the relationship is not allowed to be fixed. That is, the relationship is generally not fixed and the value of FPS does not depend on the frame synchronization frequency P_F and is arbitrarily set within a range not larger than P_F.

The image pickup apparatus 100 shown in FIG. 1 includes a lens 1, the image pickup element 2 which performs photoelectric conversion on image light received through the lens 1 so as to generate a video signal, and the rotary shutter 3 which opens an image area of the image pickup element 2 or blocks light in a predetermined interval. The image pickup element 2 includes a CMOS image sensor, for example.

Furthermore, the rotary shutter 3 is disposed between the lens 1 and the image pickup element 2. Rotation of the rotary shutter 3 is controlled by a shutter driving motor 4, a shutter controller 5, and a shutter position detector 6. The shutter driving motor 4 drives the rotary shutter 3 to be rotated. The shutter controller 5 controls the shutter driving motor 4. The shutter position detector 6 detects a rotation position (rotation phase) of the rotary shutter 3 and outputs the rotation position to the shutter controller 5.

Figure 2:
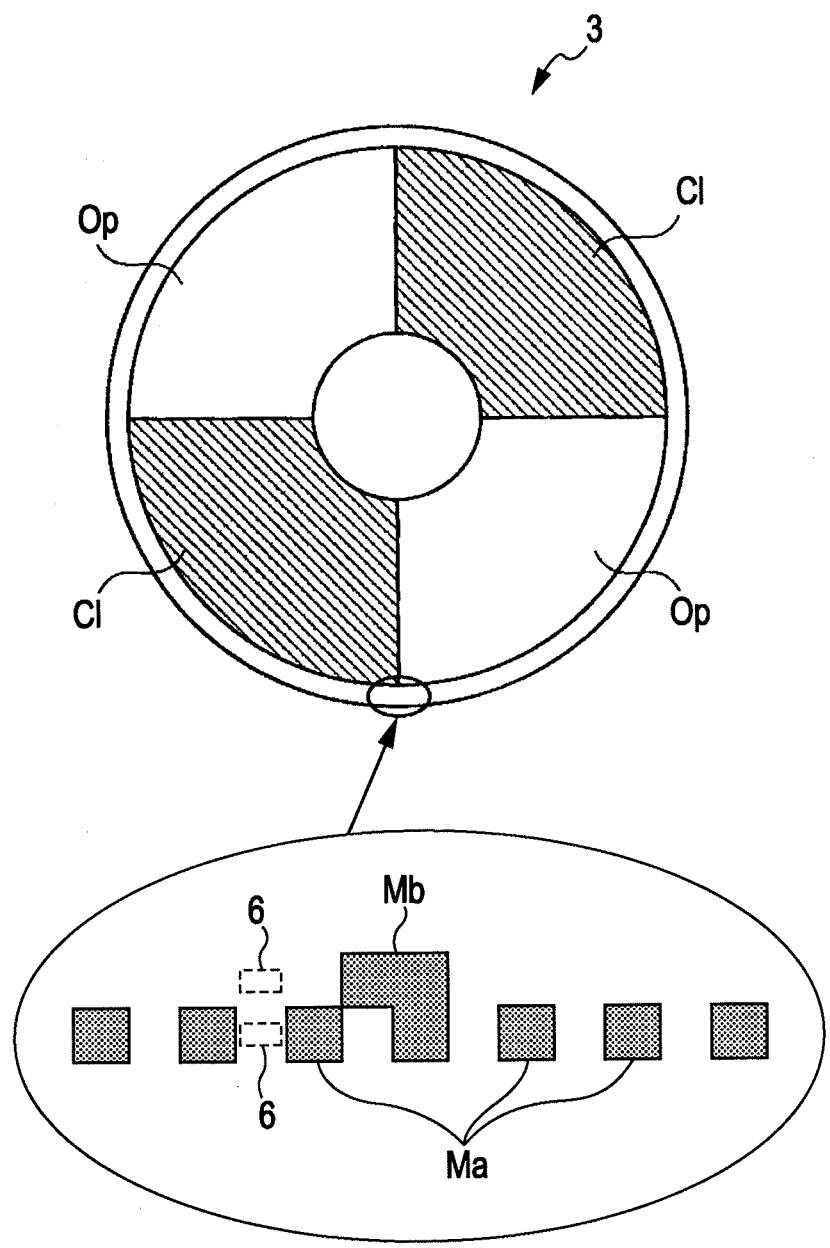
FIG. 2 is a diagram illustrating a configuration of a rotary shutter according to the embodiment of the present invention.

Referring now to FIG. 2, an example of a configuration of the rotary shutter 3 will be described. The rotary shutter 3 includes two light-shielding sections Cl which are hatched portions shown in FIG. 2 and aperture sections Op corresponding to regions other than the light-shielding sections Cl and light-shielding and opening are performed twice while the rotary shutter 3 rotates once. Note that, although the case where the rotary shutter 3 includes the two light-shielding sections Cl is taken as an example in this embodiment, the present invention is not limited to this configuration and the rotary shutter 3 may include one light-shielding section Cl or three light-shielding sections Cl, for example.

When one of the aperture sections Op of the rotary shutter 3 is positioned in front of the image area of the image pickup element 2, object light which is emitted from the lens 1 is received by the image area and a light-receiving signal is stored in the image area. On the other hand, when one of the light-shielding sections Cl is positioned in front of the image area, a light-receiving signal is not stored in the image area.

The rotary shutter 3 includes, on a circumference portion of a disk thereof, black and white markings Ma which represent positions on the circumference. The rotary shutter 3 includes 30 black and white markings Ma, for example, on the circumference with a predetermined interval. The shutter position detector 6 detects the rotation position (phase) of the rotary shutter 3 by reading the markings. Specifically, a pulse signal Pa rises when a sensor, not shown, reads one of the black markings whereas the pulse signal falls when the sensor reads one of the white markings.

Among the black markings arranged on the circumference of the rotary shutter 3, one has a shape different from those of the others. The shutter position detector 6 generates a pulse signal Pb having a pulse width different from those of the others upon reading of this marking Mb, and supplies the pulse signal Pb to the shutter controller 5. Note that although the marking Mb (second mark) having the shape different from those of the others is arranged in a portion on the circumference in this embodiment, the present invention is not limited to this and the marking Mb may be arranged in two portions on the circumference, for example.

The shutter controller 5 includes a counter (not shown) which counts the number of times the pulse signal Pa is supplied from the shutter position detector 6. A value of the counter is reset when the pulse signal Pb is input. Accordingly, the shutter controller 5 recognizes a starting point of a frame of a video signal and recognizes whether the rotary shutter 3 practically blocks light for the image pickup element 2, that is, recognizes information on a physical arrangement position of the rotary shutter 3.

In this embodiment, when one of the light-shielding sections Cl of the rotary shutter 3 is located in a portion suitable for light shielding, the shutter controller 5 generates a frame starting signal which instructs start of frame reading and outputs the frame starting signal to an image pickup controller 7.

Furthermore, the shutter controller 5 controls the number of rotations of the rotary shutter 3 in accordance with FPS information supplied from the CCU 10. The shutter controller 5 receives shutter position information supplied from the shutter position detector 6 in addition to the FPS information. In accordance with the information, the shutter controller 5 generates a motor control signal which has been corrected in a direction in which a difference between a target rotation position (phase) of the rotary shutter 3 determined in accordance with the FPS information and an actual practical rotation position (phase) detected by the shutter position detector 6 is absorbed and supplies the motor control signal to the shutter driving motor 4. That is, the shutter position detector 6, the shutter controller 5, and the shutter driving motor 4 constitute a feedback loop.

The image pickup apparatus 100 further includes the image pickup element controller 7, a signal processor 8, a transmission/reception unit 9, a serial I/O (Input/Output) encoder 11, a phase comparator 12, a voltage control oscillation unit 13, and a timing controller 14.

The image pickup controller 7 drives horizontal and vertical scanning circuits, not shown, included in the image pickup element 2 and controls a process of reading pixel signals. When the first mode is selected, the image pickup controller 7 outputs a synchronization signal which instructs the image pickup element 2 to read pixel signals for one screen (frame) at a timing when the image pickup controller 7 receives a frame starting signal from the shutter controller 5. The pixel signals for one screen read by the image pickup element 2 are output to the signal processor 8. The synchronization signal used to instruct reading of video signals for one screen is not output until the frame starting signal is supplied from the shutter controller 5.

Specifically, in a case where the first mode is selected, the reading of the pixel signals from the image pickup element 2 is executed only when the frame starting signal is supplied from the shutter position detector 6. When the frame starting signal is output from the shutter position detector 6, one of the light-shielding sections Cl of the rotary shutter 3 is positioned in front of the image pickup element 2. In this way, the pixel signals are read from the image pickup element 2 only while light is blocked.

On the other hand, when the second mode is selected, the shutter controller 5 stops control of the shutter driving motor 4. That is, when the second mode is selected, the rotary shutter 3 is not driven.

The signal processor 8 performs signal processing including a clamping process of fixing black levels of the pixel signals read from the image pickup element 2 to certain reference values, a contour emphasizing process of emphasizing a contour, and a gamma correction process of controlling a gamma value in accordance with a gamma characteristic of a display device. When the signal processor 8 performs the processing, video signals are generated from the pixel signals. In FIG. 1, modules which perform these processes are omitted.

The signal processor 8 includes a synchronization signal separation unit 81 which separates synchronization signals from the video signals output from the image pickup element 2 and a frame memory 82 (storage unit) which stores the video signals for one screen. The signal processor 8 further includes a synchronization signal separation unit 83 which separates synchronization signals which have been superposed with a return video image transmitted from the CCU 10.

The synchronization signal separation unit 81 generates the synchronization signals by separating synchronization codes such as SAV (Start Of Active Video) and EAV (End Of Active Video) from the video signals with which the synchronization signals are superposed and supplies the video signals and the synchronization signals to the frame memory 82. The frame memory 82 includes an asynchronous FIFO (First In First Out) memory, for example, and performs writing of the video signals in frame-synchronization with the synchronization signals supplied from the synchronization signal separation unit 81.

On the other hand, the reading of the video signals from the frame memory 82 is performed in accordance with the FPS information supplied from the CCU 10 in synchronization with a frame synchronization signal supplied from the CCU 10.

The transmission/reception unit 9 converts the video signals supplied from the frame memory 82 of the signal processor 8 into frequency-multiplexing signals such as HD-SDI (High Definition Serial Digital Interface) signals, supplied to the frequency-multiplexing signals to the CCU 10, and performs encoding on the frequency-multiplexing signals transmitted from the CCU 10. The returned video signals which have been subjected to the encoding are output to the synchronization signal separation unit 83 and serial data including the FPS information is output to the serial I/O encoder 11. The serial I/O encoder 11 writes the input serial data in a module which uses the information. When the FPS information is transmitted as the serial data, the FPS information is supplied to the shutter controller 5.

The synchronization signal separation unit 83 separates the synchronization codes such as SAV and EAV which have been superposed with the video signals from the video signals so as to extract a horizontal synchronization signal H and a frame synchronization signal F and supplies the extracted horizontal synchronization signal H to the timing controller 14 and the phase comparator 12. The extracted frame synchronization signal F is output to the timing controller 14. The timing controller 14 generates a free-running horizontal synchronization signals PH having a frequency the same as that of the horizontal synchronization signal H supplied from the synchronization signal separation unit 83 and outputs the free-running horizontal synchronization signal PH to the phase comparator 12.

The phase comparator 12 detects a phase difference between the horizontal synchronization signal H input from the synchronization signal separation unit 83 and the free-running horizontal synchronization signal PH input from the timing controller 14 so as to generate a voltage corresponding to the detected phase difference to be supplied to the voltage control oscillation unit 13. The voltage control oscillation unit 13 changes an oscillation frequency in accordance with the supplied voltage so that the phase of the horizontal synchronization signal H and the phase of the free-running horizontal synchronization signal PH coincide with each other. Then, the voltage control oscillation unit 13 outputs a system clock CK having an oscillation frequency of a phase locked so as to correspond to the horizontal synchronization signal H to the timing controller 14, the frame memory 82, and the shutter controller 5.

The timing controller 14 also receives the frame synchronization signal F separated by the synchronization signal separation unit 83. That is, the timing controller 14 is synchronized with the horizontal synchronization signal H supplied from the CCU 10 and also synchronized with the frame synchronization signal F. Then, the timing controller 14 outputs a horizontal synchronization signal PLH and a frame synchronization signal PLF, a phase of which have been controlled, to the frame memory 82 and the shutter controller 5.

2. Relationship Between Rotation Speed of Rotary Shutter and Rolling Distortion

Next, before control of switching between the first and second mode of the image pickup apparatus 100 of this embodiment is described, the relationship between rotation speed of the rotary shutter 3 and rolling distortion will now be described with reference to FIGS. 3 and 5.

Figure 3:
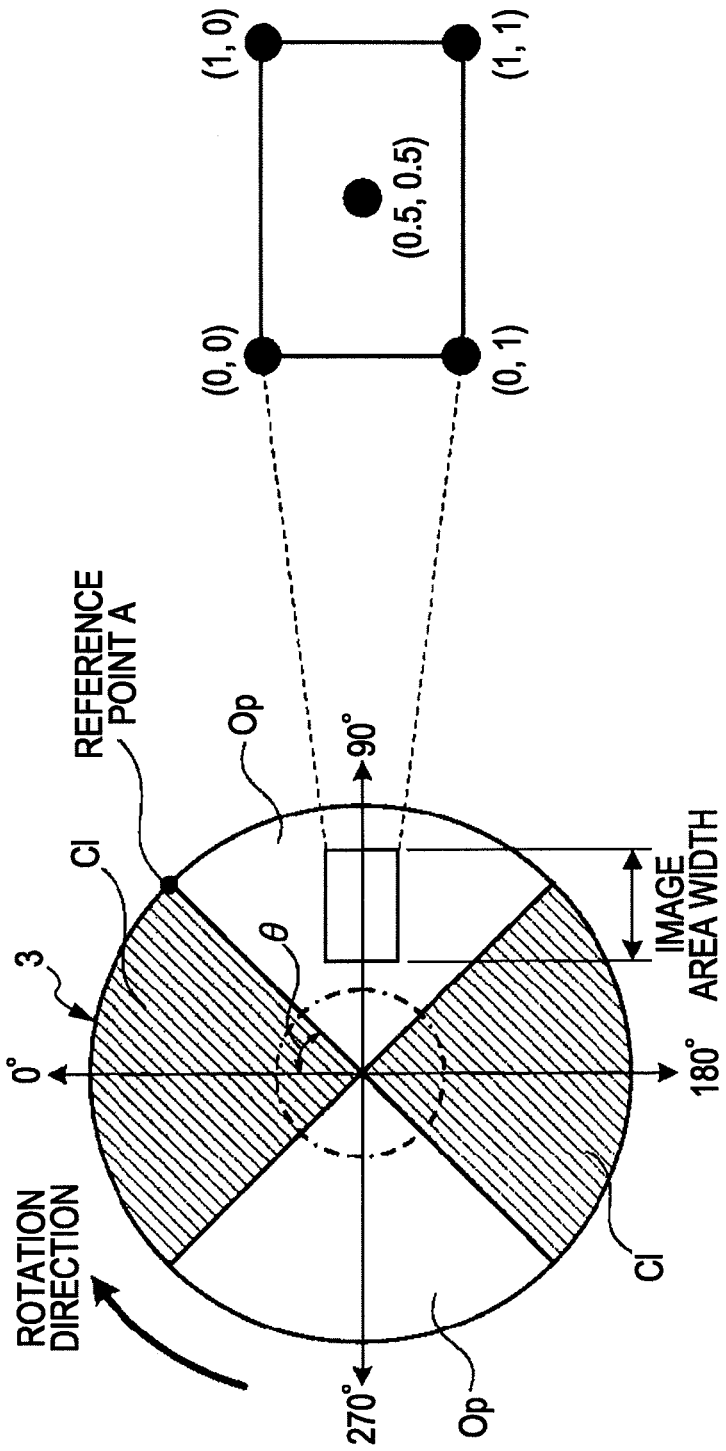
FIG. 3 is a diagram illustrating the positional relationship between the rotary shutter and an image area according to the embodiment of the present invention.

FIG. 3 is a diagram illustrating the positional relationship between the rotary shutter 3 (two apertures per rotation) shown in FIG. 2 and the image area of the image pickup element 2. In FIG. 3, portions the same as those shown in FIG. 2 are denoted by reference numerals the same as those of FIG. 2. It is assumed that the rotary shutter 3 has a disk diameter of approximately 70 mm and an optical path provided at the center of the disk of 35 mm.

The image area 20 is closed for light shielding or opened by rotating the rotary shutter 3 in a clockwise direction as shown in FIG. 3. In FIG. 3, a coordinate at an upper left corner is denoted by (0, 0), a coordinate at an upper right corner is denoted by (1, 0), a coordinate at the center of the screen is denoted by (0.5, 0.5), a coordinate at a lower left corner is denoted by (0, 1), and a coordinate at a lower right corner is denoted by (1, 1).

Figure 4A:
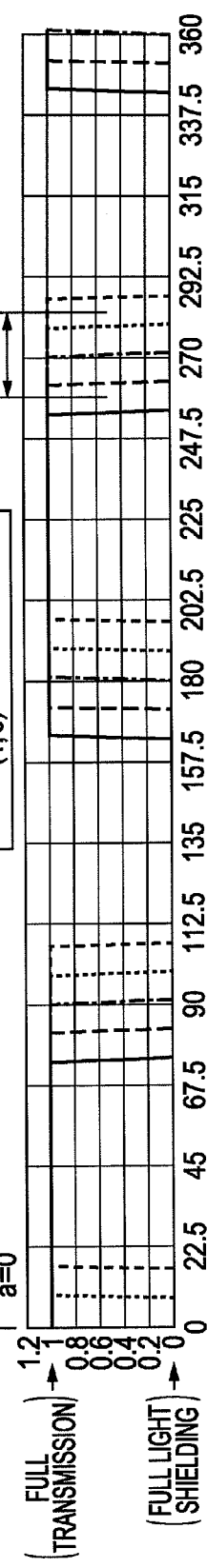
Figure 4B:

FIGS. 4A and 4B show timings when the rotary shutter 3 performs a light-shielding operation and an opening operation on various positions of the image area 20, and the timings are converted into angles. Axes of abscissa denote an angle $\theta$ at a reference point A (refer to FIG. 3) of the rotary shutter 3 and axes of ordinate denote transmittance (relative transmitted light amount) of the rotary shutter 3.

Figure 4C:
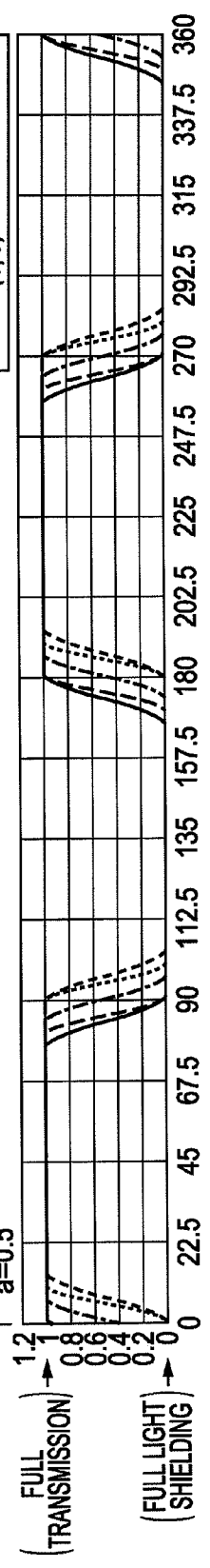
Figure 4D:
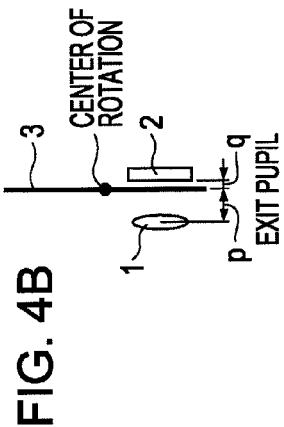

FIG. 4A shows an example of a case where a value obtained by dividing a pupil distance by a distance from a position in which the rotary shutter 3 is inserted to the image pickup element 2 is denoted by "a" and "a" is equal to 0. Here, "a=0" means that a distance q from a rotation plane of the rotary shutter 3 to an image pickup plane is smaller than a distance p from an exit pupil of the lens 1 to the rotation plane of the rotary shutter 3. That is, as shown in FIG. 4B, "a=0" represents an example of a case where the rotary shutter 3 is disposed immediately before the image pickup element 2 or a case where a lens having the pupil distance of infinity. FIG. 4C shows a case where "a" is equal to 0.5. The case where "a" is equal to 0.5 means the distance p is equal to the distance q. That is, as shown in FIG. 4D, the case where "a" is equal to 0.5 represents an example of a case where the rotary shutter 3 is disposed in the middle of a distance between the image pickup element 2 and an exit pupil position of the lens 1.

As shown in FIG. 4A, a timing when the position (0, 0) on the upper left corner of the image area 20 is subjected to light shielding and a timing when the position (0, 1) on the lower left corner is subjected to light shielding are shifted from each other by 22 degrees when calculated as an angle. This is because the rotation speed of the rotary shutter 3 has limit. That is, a period of time corresponding to 22 degrees is elapsed after the light shielding of the image area 20 is started and before the light shielding of the image area 20 is terminated.

In the example of the case where "a" is equal to 0.5 as shown in FIG. 4C, that is, when a distance to a pupil is farther, a period of time from start of the light shielding process (or the opening process) to end of the light shielding process (or the opening process) is longer in a specific position of the image area 20. That is, a timing of the light shielding process or the opening process in the specific position of the image area 20 is considerably shifted from those in other positions of the image area 20.

Figure 5A:
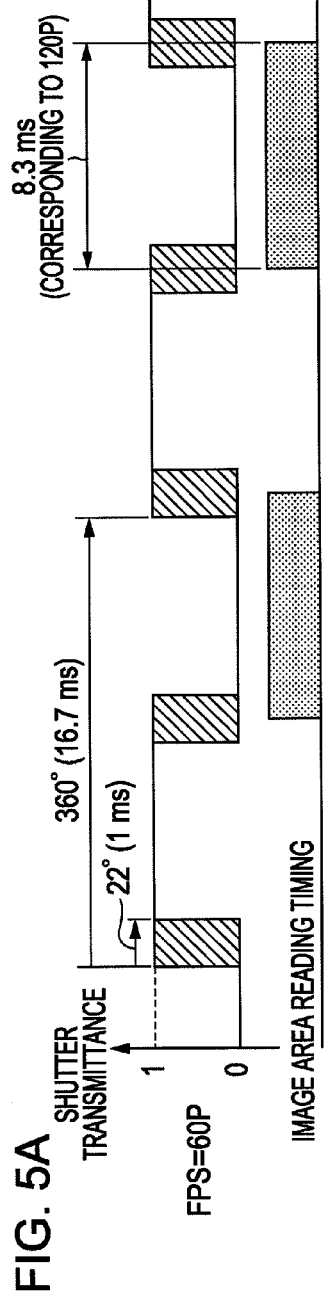
Figure 5B:
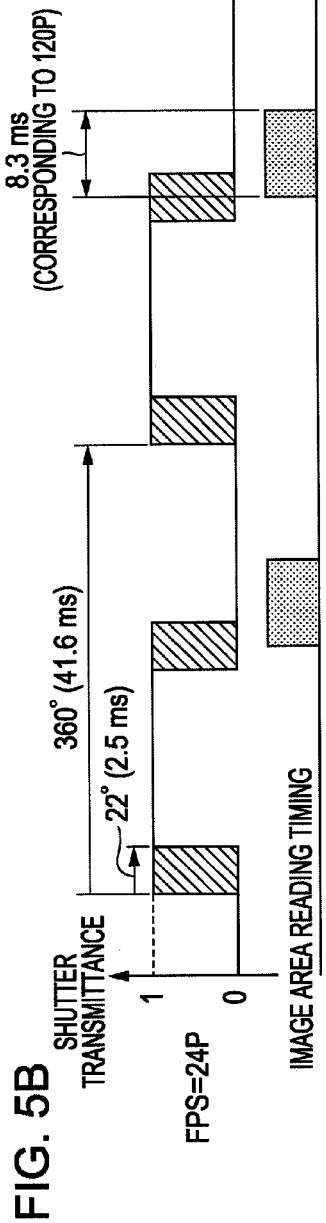
Figure 5C:
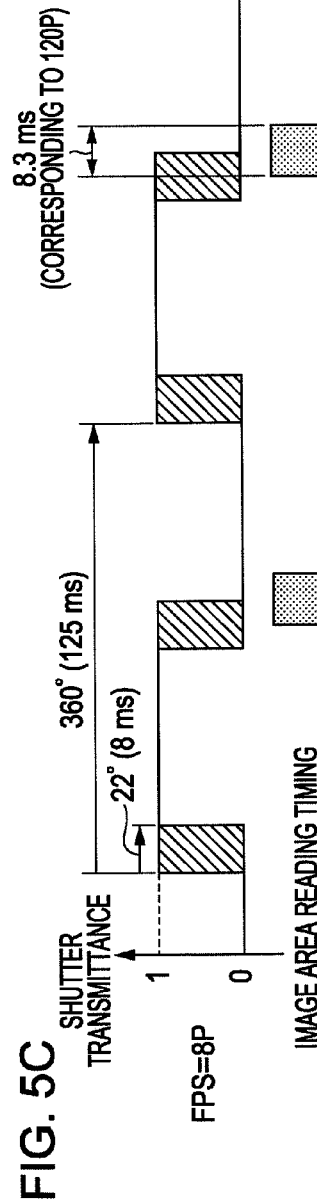

FIGS. 5A to 5C show diagrams illustrating the relationships between a period of time in which light-shielding process is performed by the rotary shutter 3 on the image area 20 and a period of time used for reading the image area 20 when the FPS is changed among 60 P, 24 P, and 8 P. In FIG. 5, these periods of time are shown as rotation angles. Axes of abscissa included in FIGS. 5A to 5C represent a rotation angle and axes of ordinate represent transmittance of the rotary shutter 3. Note that, although a size of the disk of the rotary shutter 3 corresponds to that shown in FIG. 3, the rotary shutter 3 performs the opening process once per rotation for simplicity of the description.

FIG. 5A illustrates a case where the FPS is equal to 60 P. In this case, a period of time from when a certain screen is read to when the next screen is read is 16.7 ms which is represented as "360°". Furthermore, when a period of time (light-shielding time) from when a portion of the image area 20 is subjected to the light shielding by the rotary shutter 3 to when the entire image area 20 is completely subjected to the light shielding is denoted by "Ts", the light-shielding time Ts corresponds to 22 degrees when represented as an angle and 1 ms when represented as time. On the other hand, when a period of time (reading time) to be used for sequentially reading the image area 20 from top to bottom is denoted by "Tr", the reading time Tr corresponds to 8.3 ms.

That is, as shown in FIG. 5A, when the FPS is equal to 60P, the following expression is obtained:

(Light-Shielding Time $Ts$)/(Reading Time $Tr$)≈⅛

In this case, when the rotary shutter 3 is used, a difference between a period of time used for reading an uppermost end of the screen and a period of time used for reading a lowermost end is reduced to ⅛. Accordingly, the rolling distortion is suppressed to some extent corresponding to the reduction.

On the other hand, when the FPS is equal to 24 P as shown in FIG. 5B, the following expression is obtained:

(Light-Shielding Time $Ts$)/(Reading Time $Tr$)=2.5 (ms)/8.3 ms≈3/10

That is, an effect of improvement of the rolling distortion obtained by use of the rotary shutter 3 is reduced when compared with the case where the FPS is equal to 60 P.

Moreover, when the FPS is equal to 8 P as shown in FIG. 5C, the following expression is obtained:

(Light-Shielding Time $Ts$)/(Reading Time $Tr$)=8 (ms)/ 8.3 ms≈1

That is, the effect of the improvement of the rolling distortion obtained by use of the rotary shutter 3 is negligible.

Specifically, when the FPS is set to a certain value (8 P in this embodiment) or smaller, the use of the rotary shutter 3 may increase the rolling distortion depending on the relationship between an exposure position of the image area 20 and a position of an object.

In order to address this problem, the image pickup apparatus 100 of this embodiment does not drive the rotary shutter 3 when the FPS equal to or smaller than 8 P is set. In addition, in order to reduce the rolling distortion, the reading of the image area 20 is sequentially performed from top to bottom of the screen. This mode is referred to as the second mode.

On the other hand, when the FPS larger than 8 P is set, the rotary shutter 3 is driven to suppress the rolling distortion. In addition, regions obtained by dividing the image area 20 are individually read. Accordingly, the reading time is reduced to half of the reading time Tr. That is, high-speed reading is attained. This mode is referred to the first mode hereinafter. Here, the rotation phase of the rotary shutter 3 is controlled so that the image area 20 is subjected to the light shielding when effective pixels are read from the image area 20.

Note that, although "FPS=8" is employed as a mode changing threshold in this embodiment, the threshold value is not limited to this. This value is determined in accordance with the size and a configuration of the disk of the rotary shutter 3, the reading speed of the image area 20 and the like. A mode changing condition is abstractly represented as follows:

Light Shielding Time Ts<Reading Time Tr→First Mode
Light Shielding Time Ts≧Reading Time Tr→Second Mode 3. Brief Description of First and Second Modes Referring now to FIGS. 6 and 7, methods for realizing the first and second modes of the image pickup apparatus 100 of this embodiment will be briefly described. In the image pickup apparatus 100 of this embodiment, the image area 20 is divided into two regions, i.e., upper and lower regions as shown in (a) of FIG. 6. Then, pixel signals obtained from the individual regions are read by ADCs 26a and ADCs 26b, respectively, disposed so as to correspond to pixel columns included in the regions.

Furthermore, the image pickup apparatus 100 causes the ADCs 26b to read signals (hereinafter referred to as AD dummy signals) obtained in a state in which only the ADCs 26a and 26b operate, and obtains differences between the signals and the effective pixels so that fixed-pattern noise is removed.

When the first mode is selected, as shown in (b) of FIG. 6, reading of pixels using the ADCs 26a and reading of pixel signals using the ADCs 26b are performed in parallel. At this time, the reading of the upper image area 20a is performed in a direction from the first row to the 1080th row, and the reading of the lower image area 20b is performed in a direction from the 2160th row to the 1081st row as denoted by a dashed double-dotted line.

Note that reading of the AD dummy signals are performed after the pixel signals included in the effective pixel region are read.

By performing the reading in this method, the high-speed reading of the pixel signals is attained. Furthermore, since the 1080th row and the 1081st row are read substantially at the same time, even when noise is externally entered, a difference between influence of the noise in the upper area and influence of the noise in the lower area which to appear at a boundary between the upper and lower areas is suppressed. Accordingly, generation of an unnatural image is suppressed to the minimum.

When the second mode is selected, first, the ADCs 26a read the pixel signals of the upper image area 20a and the ADCs 26b reads the pixel signals of the lower image area 20b. In this case, a reading direction of the pixel signals in terms of physical arrangement corresponds to a direction from top to bottom in both of the image areas 20a and 20b (the direction is denoted by a solid line in the upper image area 20a and by a dashed dotted line in the lower image area 20b). Also in this case, the reading of the AD dummy signals is started at a timing when the reading of the pixel signals in each of the areas have been terminated (for example, at a timing when an address of the 1081st row is specified in a case of the upper image area 20a).

Figure 16:
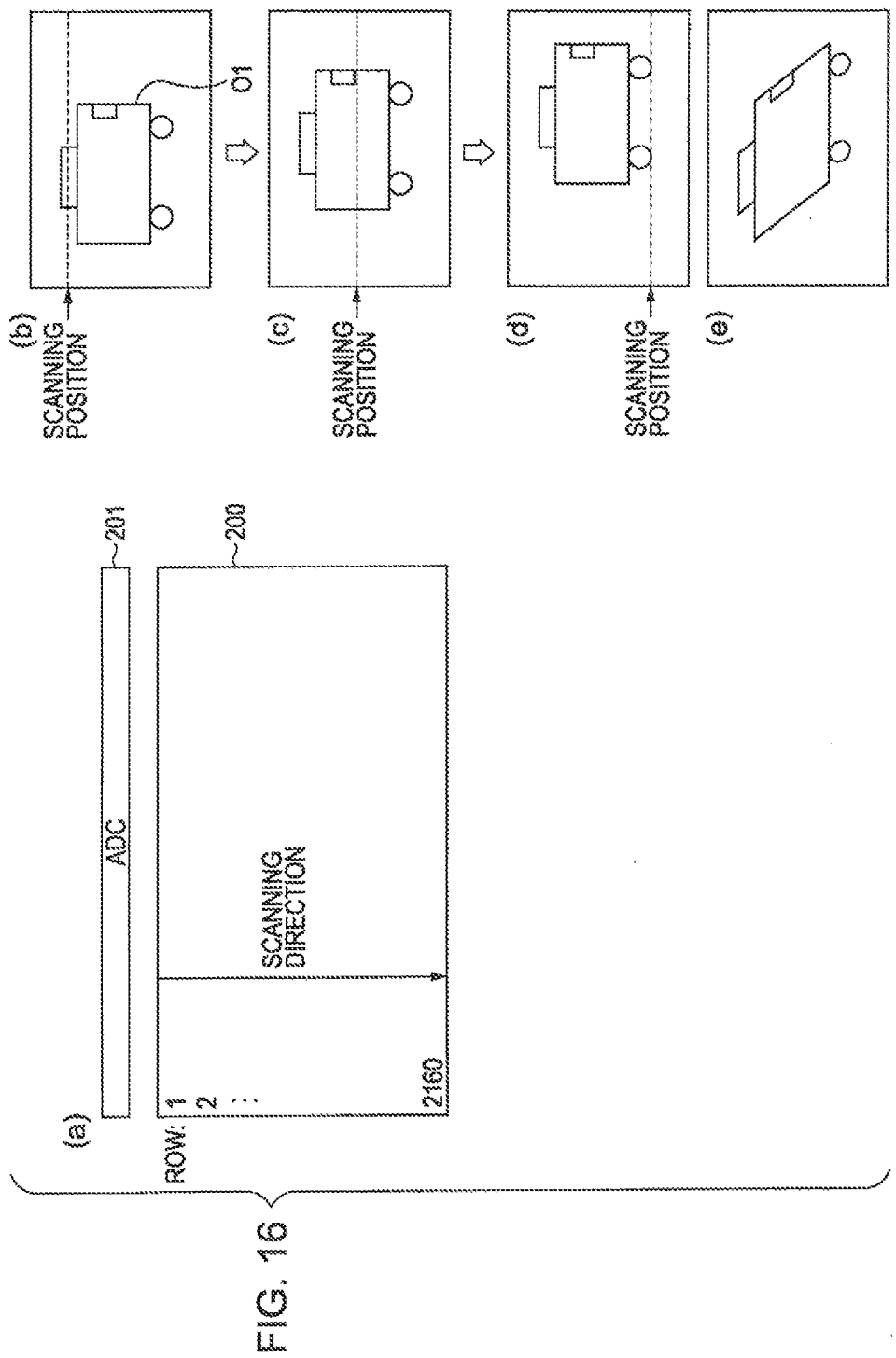
FIG. 16 shows diagrams illustrating generation of rolling distortion when an image area is scanned from top to bottom according to the related art, wherein (a) of FIG. 16 illustrates a scanning direction of the image area, (b) to (d) of FIG. 16 illustrate transition of a position of an object in accordance with shift of a scanning position, and (e) of FIG. 16 illustrates the rolling distortion generated in a finally-obtained image.

Since the reading process is performed in this way, the rolling distortion of a finally-obtained image shown in (e) of FIG. 16 is obtained although high-speed reading is not attained. That is, a picture which is more proper than those of (e) of FIG. 17 and (e) of FIG. 18 is obtained.

4. Detailed Descriptions of Methods for Realizing First and Second Modes

Example of Internal Configuration of Image Pickup Element

Figure 7:
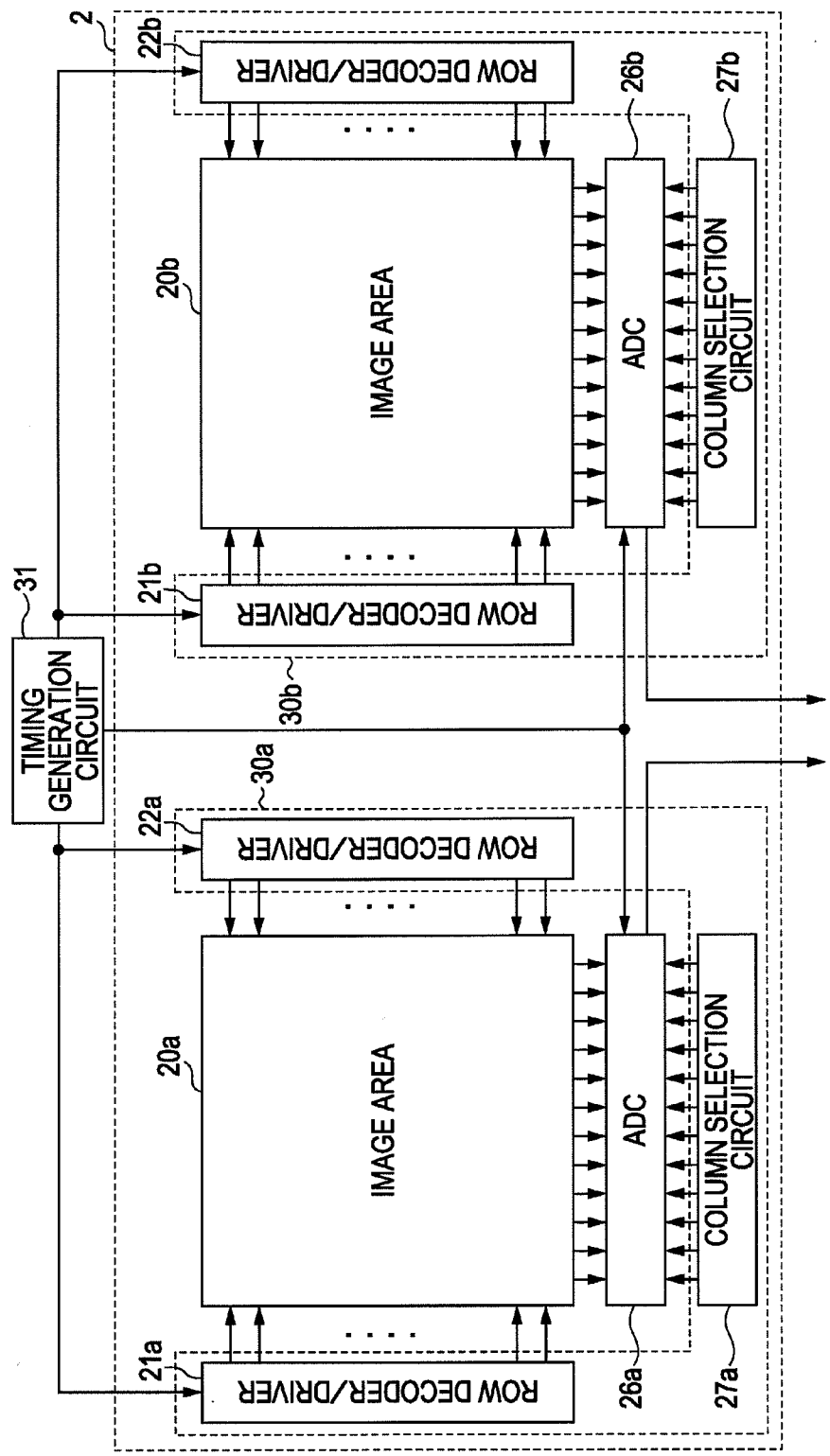
FIG. 7 is a block diagram illustrating an internal configuration of the image pickup element according to the embodiment of the present invention.
Figure 8:
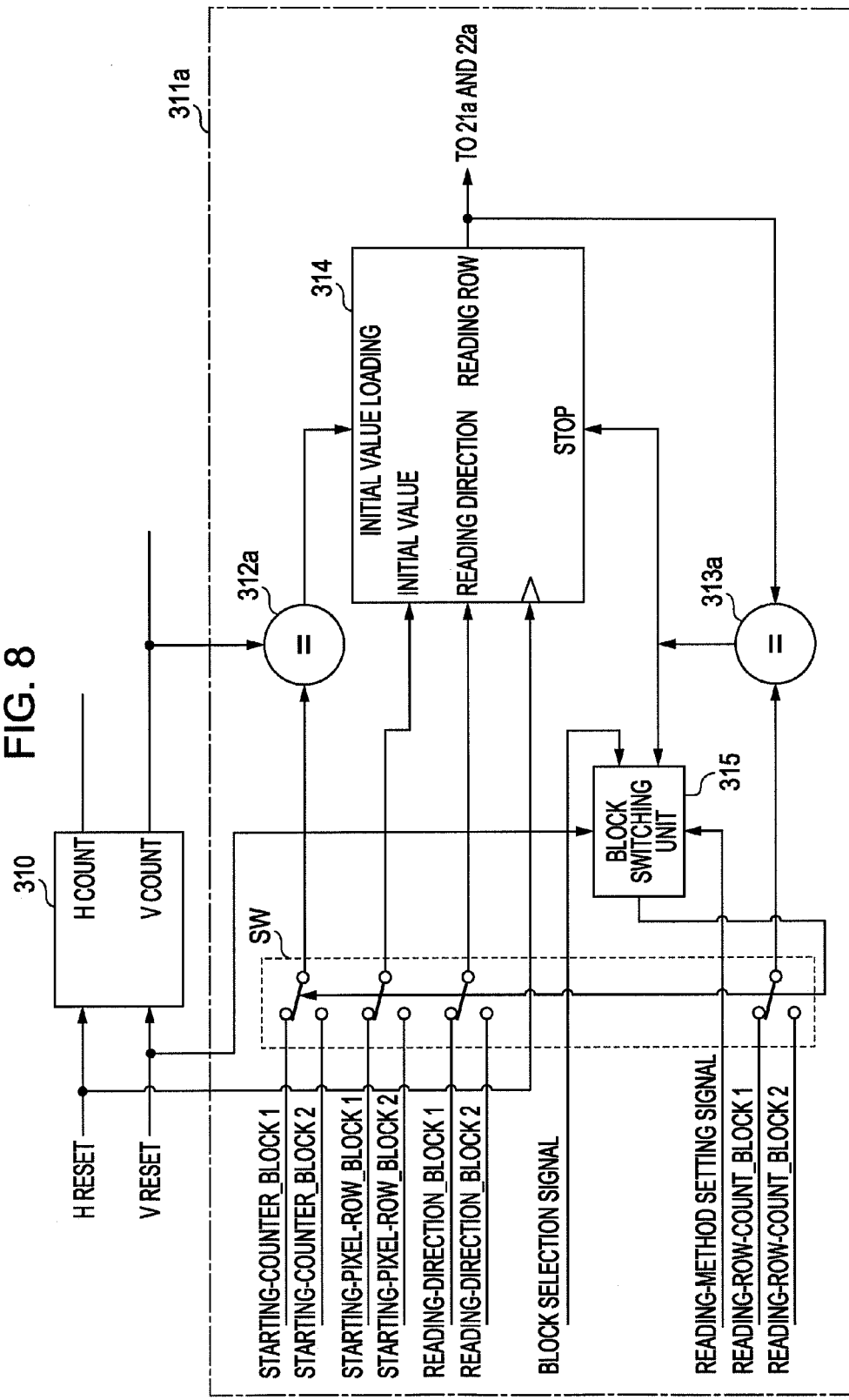
FIG. 8 is a block diagram illustrating an internal configuration of a timing generation circuit according to the embodiment of the present invention.

Referring now to FIGS. 7 to 9, the methods for realizing the first and second modes of the image pickup apparatus 100 will be described in detail. First, an internal configuration of the image pickup element 2 (refer to FIG. 1) will be described with reference to a block diagram of FIG. 7.

The image pickup element 2 shown in FIG. 7 includes the image areas 20a and 20b, driving controllers 30a and 30b, and the ADCs 26a and 26b arranged so as to correspond to individual columns. A driving controller 30 having the driving controllers 30a and 30b includes row decoder/driver circuits 21a, 22a, 21b, and 22b and column selection circuits 27a and 27b. Note that since FIG. 7 is an explanatory diagram illustrating function blocks, the arrangement shown in FIG. 7 is different from practical arrangement on a silicon chip.

Charges stored in the pixels (not shown) included in the upper image area 20a are read as pixel signals onto signal lines in a column direction for individual rows specified by the row decoder/driver circuits 21a and 22a and the pixel signals are supplied to the ADCs 26a. The ADCs 26a perform a process of converting the pixel signals into digital signals. Note that, although only one ADC 26a (ADC 26b) is shown in FIG. 7, a plurality of ADCs are practically arranged so as to correspond to the pixel columns.

The pixel signals converted into digital signals in the ADCs 26a are read for individual columns selected by the column selection circuit 27a and are output to the signal processor 8 shown in FIG. 1.

Note that the blocks which drive the image area 20b perform operation the same as those of the blocks which drive the image area 20a, and therefore, descriptions thereof are omitted.

Timing generation circuits 31 generate timing signals in accordance with a synchronization signal, a sensor driving clock, a sensor resetting signal, a serial communication signal, and the like (not shown) which are externally input. Then, the timing generation circuits 31 supply the generated timing signals to the row decoder/driver circuits 21a and 22a and the row decoder/driver circuits 21b and 22b. That is, two timing generation circuits 31 are disposed for a pair of the row decoder/driver circuits 21a and 22a and a pair of the row decoder/driver circuits 21b and 22b. Then, the timing generation circuits 31 generate a unique driving signal depending on a mode setting (first or second mode) and supply the generated driving signal to the row decoder/driver circuits 21a and 22a or the row decoder/driver circuits 21b and 22b. The timing generation circuits 31 will be described in detail with reference to FIGS. 8 and 9 hereinafter.

Example of Internal Configuration of Timing Generation Circuit

FIG. 8 is a block diagram illustrating an internal configuration of one of the timing generation circuits 31. The timing generation circuit 31 includes a master counter 310, a controller 311a or 311b (the controller 311b is not shown) corresponding to the image area 20a or 20b.

The master counter 310 receives an H resetting signal and a V resetting signal. The master counter 310 resets a count value at a timing when the V resetting signal is input and increments the count value by 1 every time the H resetting signal is input. The count value counted by the master counter 310 is supplied to a comparator 312a included in the controller 311a.

In FIG. 8, "starting-counter_block 1" and "starting-pixel-row_block 1" shown on the left side represent setting values set in the register (storage unit), not shown, in advance. Here, the setting values to be set in the register will be described with reference to FIG. 9.

Examples of the setting values set in the register include, as shown in FIG. 9, "starting counter", "starting pixel row", "the number of reading rows", and "reading direction". Each of these setting values has two different values corresponding to "block 1" and "block 2" for each of the divided image areas 20a and 20b.

The settings for "block 1" are executed in a case where a block selection signal is in a "Low" state when the V resetting signal falls. On the other hand, the settings for "block 2" are executed in a case where a block selection signal is in a "High" state when the V resetting signal falls.

Then, the block selection signal is set to the "Low" state at a timing when the light shielding performed on the image area 20 by the rotary shutter 3 is terminated whereas the block selection signal is set to the "High" state at a timing when the entire image area 20 is exposed. The switching between the settings is performed in accordance with a signal supplied from the shutter controller 5 (shown in FIG. 1).

For example, in a case where a setting for reading the effective pixels is made in "block 1" and a setting for reading the AD dummy signals is made in "block 2", if the image area 20 is in a light-shielding state when the V resetting signal is input, reading of the effective pixels is performed. On the other hand, if the image area 20 is in an exposure state at a timing when the V resetting signal is input, reading of the AD dummy signals is performed.

Returning to the description of the setting values of the register, a count value serving as a trigger of starting of the reading of the upper image area 20a or the lower image area 20b which has been specified is set as the value "starting counter". A value representing a row number in the image area 20 subjected to the reading of the pixel signals is set as the value "starting pixel row". A value representing the number of rows to be subjected to the reading is set as the value "the number of reading rows". A value representing whether the reading of the image area 20 is to be performed from an upper end of the screen or a lower end of the screen is set as the value "reading direction". Specifically, when the value "reading direction" represents a direction in which the number of rows is counted up, "Up" is set whereas when "reading direction" represents a direction in which the number of rows are counted down, "Down" is set.

That is, when the count value input from the master counter 310 coincides with the count value set as the value "starting counter", the reading of the pixel signals is performed in accordance with the setting values set in the same row in the register. That is, in one of the image areas 20a and 20b which has been specified, pixel signals for a number of rows set as the value "the number of reading rows" are read in the direction specified as the value "reading direction" with a row specified as the value "starting pixel row" as a starting point.

Referring back to FIG. 8, the description is continued. A switch SW is used to change the setting of "block 1" and the setting of "block 2" from one to another. A destination to which the switch SW is to be connected is controlled by a block switching unit 315. The switching control of the switch SW is performed by the block switching unit 315 in accordance with the block selection signal and a "reading-method setting signal".

The "reading-method setting signal" is used to control a method for switching the switch SW. Specifically, the signal has two values "parallel" and "sequential". When the first mode is selected, the value "parallel" is selected whereas when the second mode is selected, the value "sequential" is selected.

When the value "parallel" is selected, the "block selection signal" works. Specifically, in a case where the "block selection signal" is in a "Low" state when the V resetting signal is input, a reading process is performed on the image area 20 (including the AD dummy signals) in accordance with a setting of the "block 1". When the "block selection signal" is in a "High" state, a reading process is performed on the image area 20 in accordance with the setting of "block 2". On the other hand, in a case where the value "sequential" is selected, when the V resetting signal is input, first, the setting of the "block 1" is read, and thereafter, the setting of the "block 2" is automatically read. Then, the reading process is performed on the image area 20 in accordance with the read settings.

In the comparator 312a, one of a value of the starting counter set in "block 1" (starting-counter_block 1) and a value of the starting counter set in "block 2" (starting-counter_block 2) which is selected by the switch SW is input. Furthermore, in the comparator 312a, a count value is supplied from the master counter 310.

That is, the comparator 312a compares the count value supplied from the master counter 310 with the counter value set as "starting-counter_block 1 (or 2)". When the count value supplied from the master counter 310 coincides with the counter value set as "starting-counter_block 1 (or 2)", the comparator 312a supplies a signal representing "true" to a driving signal generator 314, and otherwise, the comparator 312a supplies a signal representing "false" to the driving signal generator 314.

The driving signal generator 314 includes a counter capable of performing switching between a count-up operation and a count-down operation. The driving signal generator 314 receives a signal supplied from the comparator 312a, the setting value of "starting-pixel-row_block 1 (or 2)", the setting value of "reading-direction_block 1 (or 2)" and the H resetting signal. The driving signal generator 314 loads the value set in "starting-pixel-row_block 1 (or 2)" as an initial value at a timing when a signal representing "true" is supplied from the comparator 312a. Then, the count value of the driving signal generator 314 is counted up or counted down every time the H resetting signal is input in accordance with the setting value "reading-direction_block 1 (or 2)". A result of the counting corresponds to a driving signal which specifies a row from which pixel signals are read, and is supplied to the row decoder/driver circuits 21a and 22a in synchronization with the H resetting signal.

The driving signal generator 314 and the block switching unit 315 receive signals supplied from a comparator 313a. The comparator 313a compares the number of rows set as the value "reading-row-count_block 1 (or 2)" with the number of rows specified in a driving signal practically output from the driving signal generator 314. When the number of rows practically read coincides with the number of rows set as the value "reading-row-count_block 1 (or 2)", the comparator 313a generates a signal used to stop reading and supplies the signal to the driving signal generator 314. Note that when a value of the "reading-method setting signal" corresponds to "sequential" and the switch SW has selected "block 1", the block switching unit 315 causes the switch SW to select "block 2" in response to an input from the comparator 313a.

5. Examples of Detailed Settings of First and Second Modes

First Mode: AD Dummy Signals are Read After Effective Pixels are Read

Figure 10:
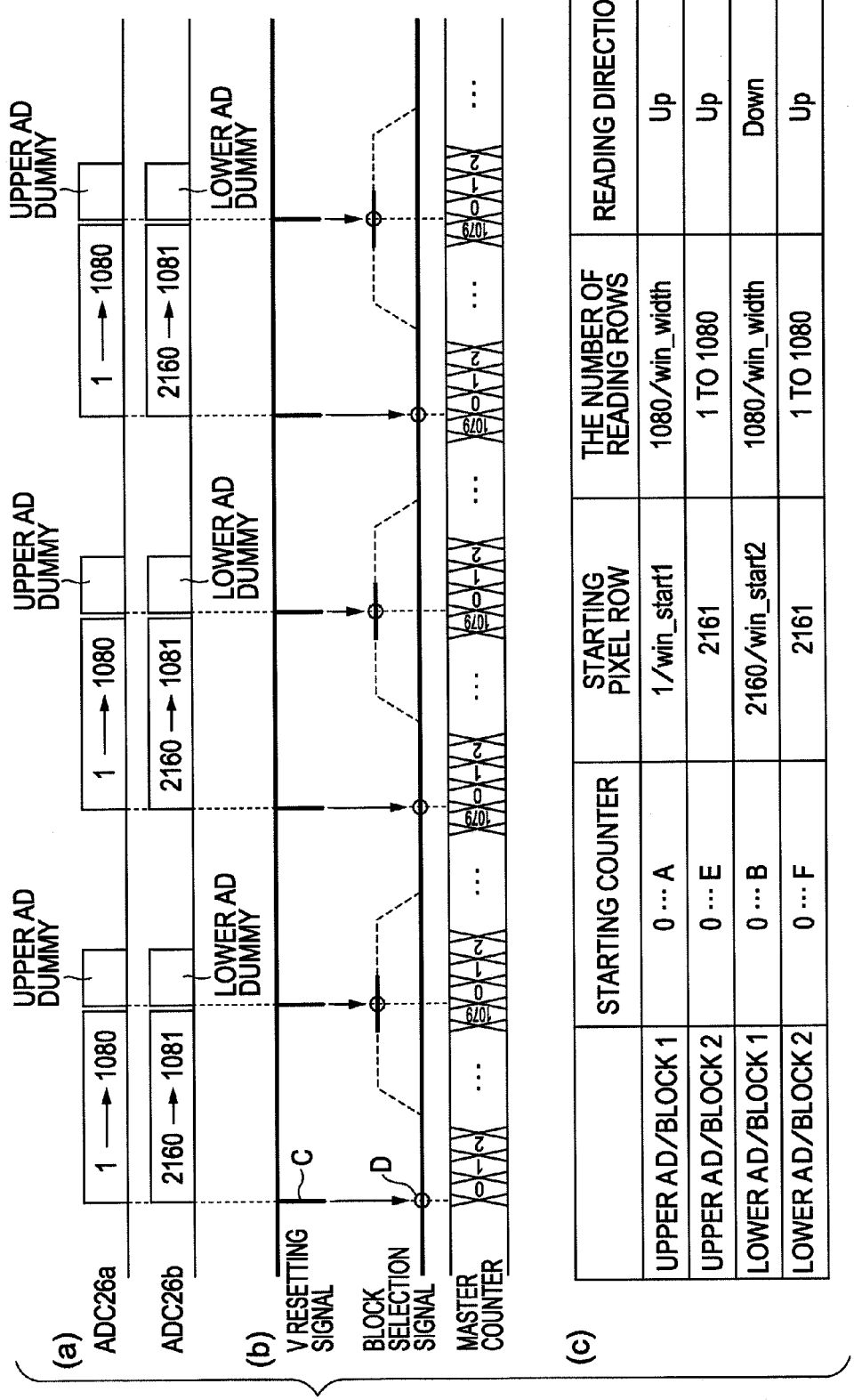
FIG. 10 shows diagrams illustrating a setting for the first mode according to the embodiment of the present invention, wherein (a) of FIG. 10 illustrates a method for reading the image area, (b) of FIG. 10 illustrates the relationship among a V resetting signal, a block selection signal, and a master counter, and (c) of FIG. 10 illustrates a setting of the register.

Next, examples of detailed settings of the first and second modes will be described with reference to FIGS. 10 to 14. FIG. 10 shows an example of a setting for realizing the first mode.

In the first mode, the upper image areas 20a and 20b are simultaneously read, and in addition, the reading of the upper image area 20a is performed from top to bottom whereas the read reading of the lower image area 20b is performed from bottom to top.

That is, as shown in (a) of FIG. 10, the reading of the first to 1080th rows included in the upper image area 20a and the reading of the 2160th to 1081st rows included in the lower image area 20b are performed in parallel. Parallel reading of both of the upper image areas 20a and 20b is realized in this way.

Furthermore, the AD dummy signals generated by the ADCs 26a and 26b are read after the effective pixels have been read.

These operations are realized by generating a driving signal which specifies a row to be read by the driving signal generator 314 and reading pixel signals in accordance with the driving signal.

A row "upper AD and block 1" includes settings for realizing an operation performed when "block 1" is selected in the upper image area 20a serving as the upper region of the image area 20, and "0" is set to a column "starting counter". As shown in (b) of FIG. 10, when the count value supplied from the master counter 310 corresponds to "0" and a V resetting signal represented by (C) is input, the block selection signal is in a "Low" state as represented by (D). Then, the values set in the row "upper AD and block 1" in (c) of FIG. 10 are supplied to the driving signal generator 314 (refer to FIG. 8) corresponding to the upper image area 20a.

In the column "starting pixel row", a value "1/win_start1" has been set. Here, "/" is used as a symbol representing "or" and means that "1" or "win_start1" has been set as a setting value. Note that "win_start1" represents a setting value which is selected when a "window reading" operation in which reading is started from an arbitrary row instead of a top of an image. An arbitrary value selected from among "1" to "1079" is set as the value "win_start1".

In the column "the number of reading rows", "1080/win_width" has been set. Note that "win_width" also represents a setting value for specifying the number of rows to be read which is set when the "window reading" operation is performed, and an arbitrary value selected from among "1" to "1080" is set. In the column "reading direction", a value "Up" has been set.

A row "upper AD and block 2" includes settings for realizing an operation to be performed when "block 2" is selected. In the column "starting counter", a value "0" has been set.

In the column "starting_pixel_row", a value "2126" has been set. That is, the 2161st row which follows the 2160th row in which the reading of the pixel signals of the effective pixels is to be terminated is specified as a row in which a reading process is started. In the image pickup element 2 of this embodiment (refer to FIG. 1), when this row (the 2161st row or subsequent rows) is specified, only A/D conversion is performed without reading pixels by the ADCs 26a. This operation is performed so that variation of characteristics of AD convertors included in the ADCs 26a corresponding to the rows is obtained. Signals generated in this way are referred to as "AD dummy signals". Then, in accordance with the AD dummy signals, the CCU 10 (refer to FIG. 1) corrects the variation (which appears as stripes in the screen) of the AD convertors corresponding to the rows of the ADCs 26a. Hereinafter, this correction is referred to as "stripe correction". Note that the AD dummy signals may be read in regions other than a region of the effective pixels. Accordingly, when arbitrary values are set in "starting counter" of (E) and (F), the reading of the AD dummy signals may be performed at a desired timing.

In the column "the number of reading rows", a value "1 to 1080" has been set. Practically, one of values (numbers) among "1 to 1080" is set. The larger the value is, the larger the number of rows subjected to the reading of AD dummy signals. On the other hand, the smaller the value is, the smaller the number of rows subjected to the reading of the AD dummy signals.

When the number of rows subjected to the reading of the AD dummy signals is increased, noise cancelling is performed using a larger number of AD dummy signals. Accordingly, the CCU 10 (refer to FIG. 1) performs a process of suppressing random noise caused by operation of the ADCs 26a or 26b, i.e., the strip correction, using a synchronization addition average of the AD dummy signals corresponding to a plurality of rows. However, if the number of rows from which AD dummy signals are to be read is increased, there arises a problem in that power consumption is increased and processing time is increased.

Therefore, in the column "the number of reading rows" used when AD dummy signals are to be read, an appropriate value is set in accordance with an amount of noise included in an effective pixel to be corrected.

In the column "reading direction" of the row "upper AD and block 2", a value "Up" has been set.

In the column "starting counter" of the row "lower AD and block 1", a value "0" has been set. Furthermore, in the column of "starting pixel row", a value "2160/win_start2" has been set. Here, the value "win_start2" is set when the "window reading" operation is performed, and an arbitrary value selected from among "1" to "1079" is set. In the column of "the number of reading rows", a value "1080/win_width" has been set. The value "1080/win_width" is also a setting value for specifying the number of rows to be read which is set when the "window reading" operation is performed. In the column "reading direction", a value "Down" has been set.

In the row "lower AD and block 2" and the column "starting counter", a value "0" has been set. Furthermore, in the column "starting pixel row", a value "2161" has been set, and in the column "the number of reading rows", an arbitrary value (number) selected from among "1 to 1080" has been set. Furthermore, in the column "reading direction", a value "Up" has been set.

With this setting, when a value larger than 8 P is set to the FPS, first, the value "parallel" is selected as the "reading method setting signal" in order to realize the operation of the "first mode". Subsequently, the V resetting signal is input. At this time, when the "block selection signal" is in a "Low" state, the setting of "block 1" is read.

The relationship among the V resetting signal, the block selection signal, and the count value of the master counter 310 is shown in (b) of FIG. 10. According to (b) of FIG. 10, every time the V resetting signal is supplied, a value of the block selection signal is switched between "High" and "Low". As described above, the block selection signal is set to a "Low" state when light shielding of the image area 20 is completed by the rotary shutter 3 and set to a "High" state when the image area 20 is totally exposed.

That is, when the block selection signal is in the "High" state, the image area 20 is in an exposure state whereas when the block selection signal is in the "Low" state, the image area 20 is in a light-shielding state. Furthermore, according to (b) of FIG. 10, every time the V resetting signal is supplied, the count value of the master counter 310 is reset to "0".

In this way, first, pixel signals in the first row specified in the column "starting pixel row" are read at a timing when the counter value input from the master counter 310 (refer to FIG. 8) corresponds to "0" which is specified in the column "starting counter" in the upper image area 20a. Then, reading of pixel signals is performed on the subsequent 1080 rows. At this time, as a reading direction, the value "Up" is set in the column "reading direction", and accordingly, the reading is performed in a direction in which a number of a row becomes larger (from top to bottom in the screen).

In parallel to this operation, in the lower image area 20b, pixel signals in the 2161st row which has been specified in the column "starting pixel row" are read at a timing when the counter value input from the master counter 310 (refer to FIG. 8) corresponds to "0". Then, the reading of pixel signals is performed on the subsequent 1080 rows which is determined in the column "the number of reading rows". At this time, as a reading direction, the value "Down" is set in the column "reading direction", and accordingly, the reading is performed in a direction in which a number of a row becomes smaller (from bottom to top in the screen).

As described above, since the reading processes are performed on the upper image areas 20a and 20b in parallel in accordance with the setting values shown in (c) of FIG. 10, the pixel signals are read at high speed (at double speed).

When a next V resetting signal is input and therefore the count value of the master counter 310 is reset to "0" and when the "block selection signal" is in a "High" state, only the setting of "block 2" is read.

Accordingly, in the upper image area 20a, at a timing when the counter value input from the master counter 310 corresponds to "0" which is specified in the column "starting counter", AD dummy signals in the 2161st row specified in the column "starting pixel row" are read. Then, reading of the AD dummy signals is performed on a number of rows corresponding to the value specified in the column "the number of reading rows". Since as a reading direction, the value "Up" has been set in the column "reading direction", the reading is performed in a direction a number of a row becomes larger (from top to bottom in the screen). At this time, since a setting for continuously reading AD dummy signals after the 2161st row has been made, AD dummy signals corresponding to a desired number of rows may be read.

In parallel to this operation, in the lower image area 20b, pixel signals in the 2161st row specified in the column "starting pixel row" are read at a timing when the counter value input from the master counter 310 corresponds to "0". Then, the reading of pixel signals is performed on a number of rows specified in the column "the number of reading rows". At this time, as a reading direction, the value "Up" is set in the column "reading direction", and accordingly, the reading is performed in a direction in which a number of a row becomes larger (from top to bottom in the screen). Since a setting for continuously reading AD dummy signals after the 2161st row has been made, AD dummy signals corresponding to a desired number of rows may be read.

A signal processor included in the CCU 10 (refer to FIG. 1) performs synchronization addition averaging on a desired number of AD dummy signals read as described above. Then, differences between a value obtained through the synchronization addition averaging and the effective pixels are obtained to thereby fixed pattern noise is removed.

Second Mode: AD Dummy Signals are Read After Effective Pixels are Read

Figure 11:
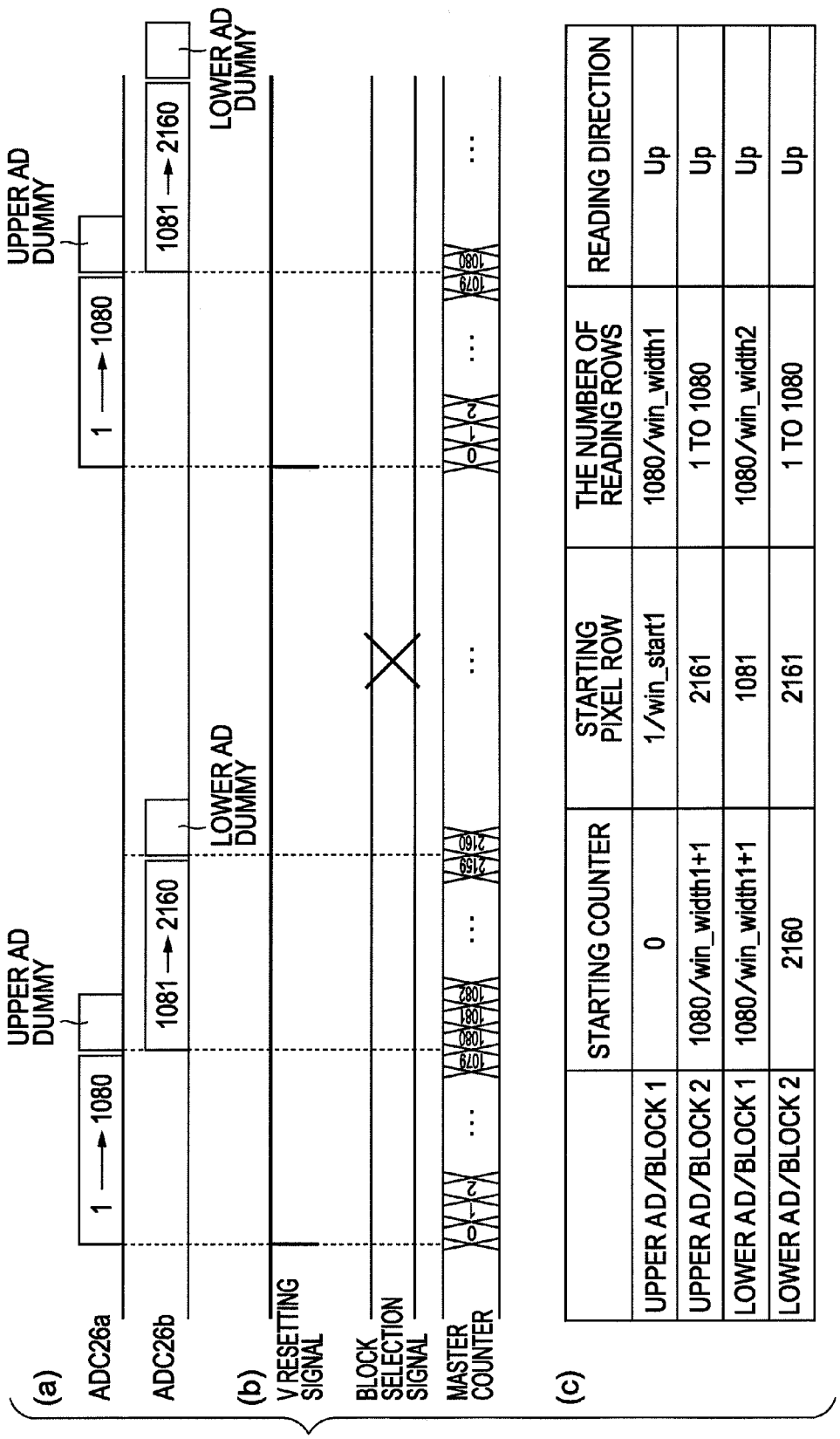
FIG. 11 shows diagrams illustrating the second mode and a setting for realizing reading of AD dummy signals performed after reading of effective pixels according to the embodiment of the present invention, wherein (a) of FIG. 11 illustrates a method for reading the image area, (b) of FIG. 11 illustrates the relationship among the V resetting signal, the block selection signal, and the master counter, and (c) of FIG. 11 illustrates a setting of the register.

Referring now to FIGS. 11 to 14, an example of a setting for realizing the second mode and an operation thereof will be described. FIG. 11 shows an example of a case where reading of AD dummy signals are performed after effective pixels are read.

In the second mode, reading of the lower image area 20b is performed after reading of the upper image area 20a is terminated. Here, the image areas 20a and 20b are read from top to bottom.

Specifically, as shown in (a) of FIG. 11, first, the first row to the 1080th row in the upper image area 20a are subjected to a reading process, and thereafter, the 1081st row to the 2160th row in the lower image area 20b are subjected to a reading process. This reading processes are realized by performing a setting of reading of effective pixels in "block 1" and a setting of reading of AD dummy signals in "block 2" and selecting the value "sequential" as the "reading method setting signal".

Furthermore, this operation is realized by generating a driving signal for specifying a row to be read by the driving signal generator 314 shown in FIG. 8 and reading pixel signals in accordance with the driving signal.

Note that, when the second mode is selected and when the value of FPS is set to 8 P or smaller, the rotary shutter 3 is not driven, and therefore, the shutter controller 5 (refer to FIG. 1) does not supply a signal for driving the rotary shutter 3. Therefore, the block selection signal used to determine an exposure state or a light-shielding state at a time of supply of the V resetting signal is not output. Accordingly, the count value of the master counter 310 is reset to "0" only when the V resetting signal is input.

In a column "starting counter" of a row "upper AD and block 1" (c) of FIG. 11, a value "0" has been set, and in a column "starting pixel row", a value "1/win_start1" has been set. Furthermore, in a column "the number of reading rows", a value "1080/win_width1" has been set, and in a column "reading direction", a value "Up" has been set. The values "win_start1" and "win_width1" have been already described, and therefore, descriptions thereof are omitted.

In the column "starting counter" of a row "upper AD/block 2", a value "1080/win_width1+1" has been set. That is, content set in the row "upper AD/block2" is executed at a timing when the reading of the effective pixels in the upper image area 20a is terminated and the value of the master counter 310 is incremented.

In the column "starting pixel row", a value "2161" has been set. When this row is specified, the ADCs 26a start generating AD dummy signals.

In the column "the number of rows", an arbitrary value (number) selected from among "1 to 1080" has been set, and in the column "reading direction", a value "Up" has been set.

In a row "lower AD and block 1" and the column "starting counter", a value "1080/win_width1+1" has been set. That is, content set in the row "lower AD and block 1" is executed when the reading of effective pixels in the upper image area 20a is terminated in the 1080th (wing_width1) row and the value of the master counter 310 corresponds to a value "1081 (win_width1+1)".

In the column "starting pixel row", a value "1081" has been set, and in the column "the number of reading rows", a value "1080/win_width2" has been set. Furthermore, in the column "reading direction", a value "Up" has been set.

In a row "lower AD and block 2" and the column "starting counter", a value "2160" has been set. That is, content set in the row "lower AD and block 2" is executed when the count value of the master counter 310 corresponds to "2161" after the reading of effective pixels in the 2060th row has been terminated in the lower image area 20b.

In the column "starting pixel row", a value "2161" has been set, and in the column "the number of reading rows", an arbitrary value (number) selected from among "1 to 1080" has been set. Furthermore, in the column "reading direction", a value "Up" has been set.

Accordingly, in the upper image area 20a, at a timing when the counter value input from the master counter 310 corresponds to "0" which has been specified in the column "starting counter", pixel signals in the first row specified in the column "starting pixel row" has been read. Then, reading of pixel signals is performed on the subsequent rows until the 1080th row is reached which is specified in the column "the number of reading rows". As a reading direction, since the value "Up" has been set in the column of "reading direction", the reading is performed in a direction in which a number of a row is increased (from top to bottom in the screen).

When the reading of pixel signals in the upper image area 20a is performed to the 1080th (/win_width1) row, the switch SW selects "block 2" in accordance with a comparison result obtained from the comparator 313a (refer to FIG. 8) since a value of a "reading setting method" corresponds to "sequential". The count value output from the master counter 310 is "1081 (win_width1+1)". That is, the value coincides with the value set in the row "upper AD and block 2" and the column "starting counter" and the value set in the row "lower AD and block 1" and the column "starting counter".

Accordingly, a number of AD dummy signals included in a number of rows set in the column "the number of reading rows" are read starting from the row (2161) set in the row "upper AD and block 2" and the column "starting pixel row". Here, the reading is performed in a direction in which a number of a row becomes large (from top to bottom in the screen) in accordance with the setting of the value "Up".

Furthermore, pixel signals for "1080 (/win_width2)" rows, the number of which has been set in the column "the number of reading rows", are read from the row (1081) which has been set in the row "lower AD and block 1" and the column "starting pixel row". Here, the reading is performed in a direction in which a number of a row becomes large (from top to bottom in the screen) in accordance with the setting of the value "Up".

In the lower image area 20b, even after the pixel signals for the 1080 (/win_width2) rows are read starting from the 1081st (/win_width2+1) row, counting is continuously performed, and the count value of the master counter 310 reaches "2160". That is, the count value coincides with the value which has been set in the row "lower AD and block 2" and the column "starting counter". Accordingly, AD dummy signals for a predetermined number of rows which has been set in the column "the number of reading rows" are read from the 2161st row which has been set in the row "lower AD and block 2" and the column "starting pixel row". Here, the reading is performed in a direction in which a number of a row becomes large (from top to bottom in the screen) in accordance with the setting of the value "Up".

As described above, since the reading is performed on the upper image area 20a followed by the lower image area 20b in accordance with the setting values shown in (c) of FIG. 11, the rolling distortion which appears is reduced as shown in FIG. 16.

Second Mode: Effective Pixels are Read After AD Dummy Signals are Read

Note that, in FIGS. 10 and 11, the case where reading of AD dummy signals is performed after reading of effective pixels is terminated is taken as an example. However, the reading of AD dummy signals may be performed before the reading of effective pixels.

Figure 12:
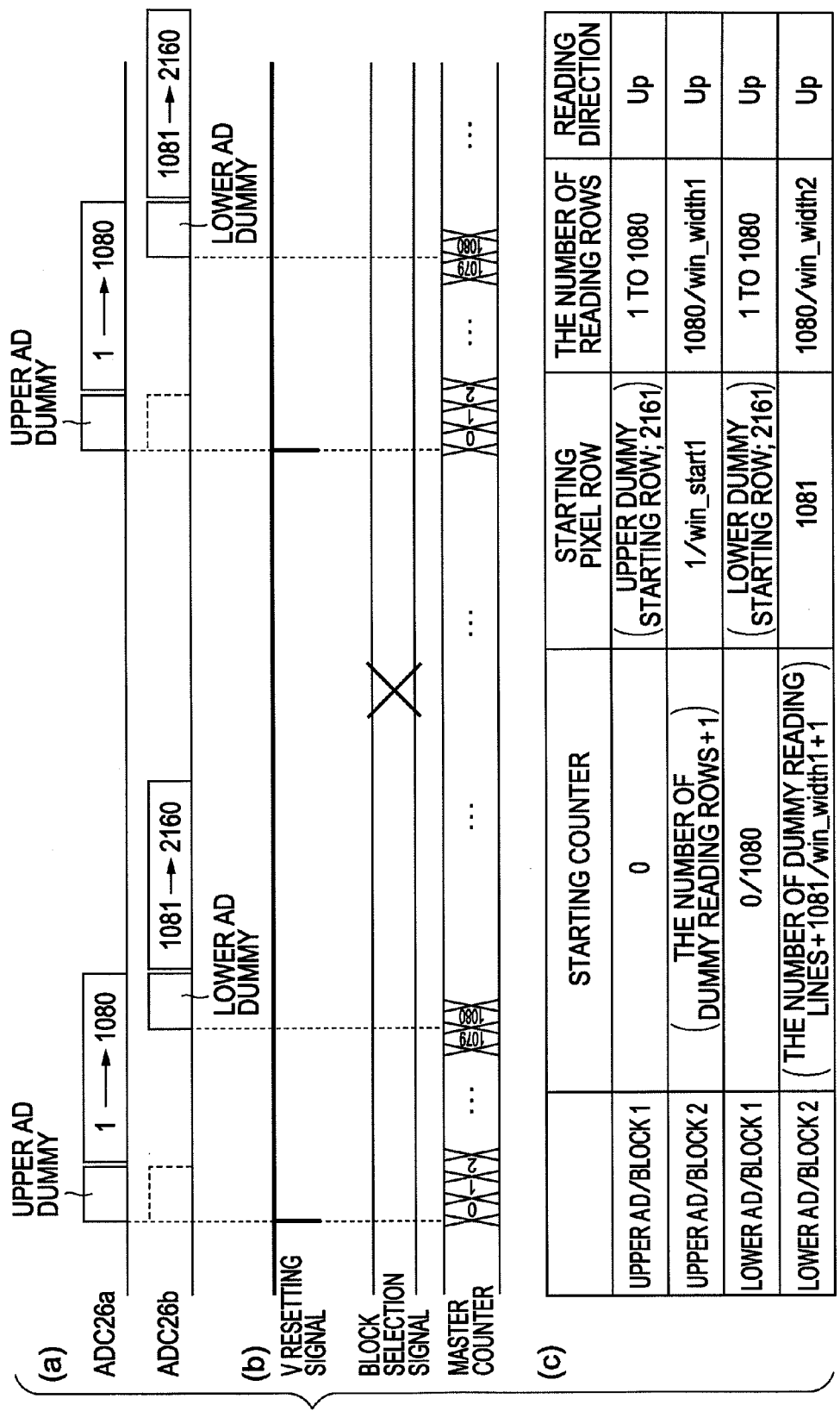
FIG. 12 shows diagrams illustrating the second mode and a setting for realizing reading of AD the dummy signals performed before reading of the effective pixels according to the embodiment of the present invention, wherein (a) of FIG. 12 illustrates a method for reading the image area, (b) of FIG. 12 illustrates the relationship among the V resetting signal, the block selection signal, and the master counter, and (c) of FIG. 12 illustrates a setting of the register.

FIG. 12 shows a setting for reading of AD dummy signals performed before reading of effective pixels is performed in the second mode. This reading process is realized by performing setting for reading of AD dummy signals in "block 1" and setting for reading of pixel signals in "block 2".

Specifically, a number of a row ("2161") from which the reading of AD dummy signals is to be started is set in a row "upper AD and block 1" and a column "starting pixel row", and the number of rows from which AD dummy signals are to be read is set in a column "the number of reading rows". A value of a column "starting counter" is set to "0". Then, a value "the number of rows from which AD dummy signals are read+1" is set in a row "upper AD and block 2" and the column "starting counter". Then, a value "1 (/win_start1)" is set in the row "upper AD and block 2" and the column "starting pixel row", and a value "1080 (/win_width1)" is set in the column "the number of reading rows".

With these settings, AD dummy signals for a number of rows specified in the column "the number of reading rows" are read starting from a row specified in the column "starting pixel row" at a timing when the count value of the master counter 310 corresponds to "0". Thereafter, when the count value of the master counter 310 coincides with a value "a row from which AD dummy signals are read +1", pixel signals for 1080 (/win_width1) rows starting from the first (/win_start1) row of the upper image area 20a are read.

Similar settings are performed on the rows "lower AD and block 1" and "lower AD and block 2", and reading in the lower image area 20b is similarly performed.

Note that when the setting value corresponding to the row "lower AD and block 1" and the column "starting counter" is set to be the same as the value (0) similarly to the row "upper AD and block 1" and the column "starting pixel row", a timing when AD dummy signals are read from the upper image area 20a coincides with a timing when AD dummy signals are read from the lower image area 20b.

Note that the description has been made assuming that the V resetting signal is input at a constant interval. However, even when the input interval of the V resetting signal is smaller, the same advantage is obtained by controlling a setting value of the register.

Example of Case Where Supply Interval of V Resetting Signal is Smallest

Figure 13:
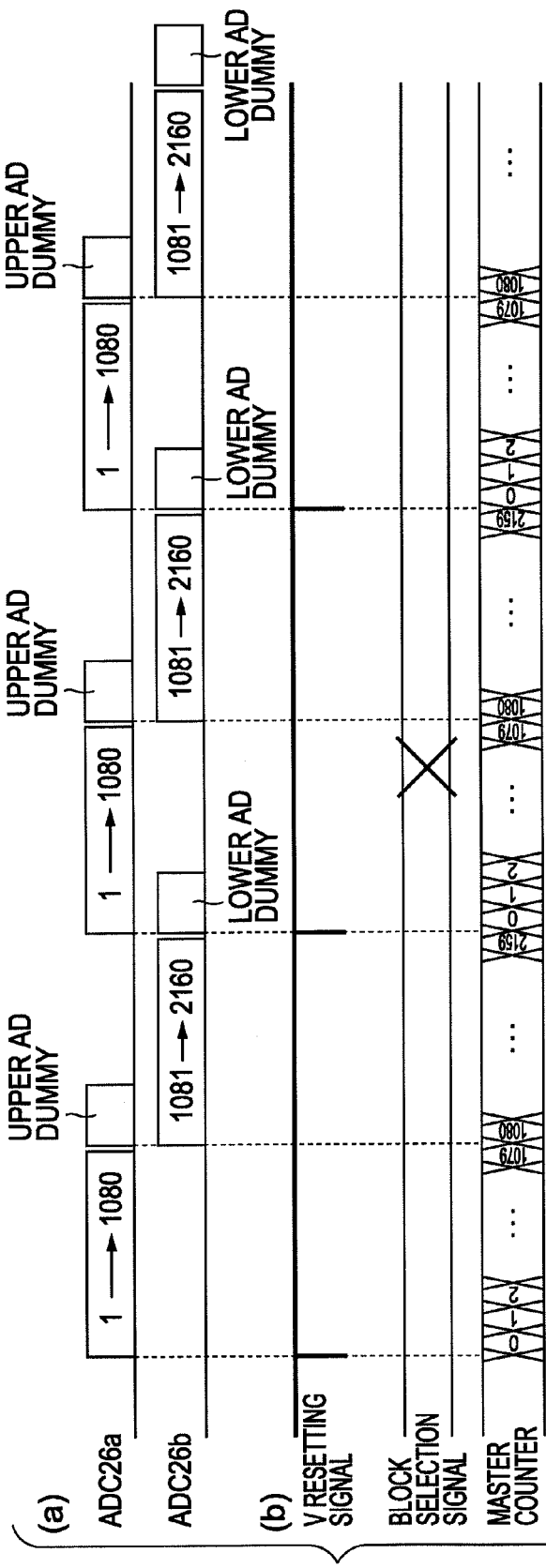
FIG. 13 shows diagrams illustrating the second mode and a setting for realizing reading the AD dummy signals performed after reading of the effective pixels when the V resetting signals are supplied with small intervals according to the embodiment of the present invention, wherein (a) of FIG. 13 illustrates a method for reading the image area, (b) of FIG. 13 illustrates the relationship among the V resetting signal, the block selection signal, and the master counter, and (c) of FIG. 13 illustrates a setting of the register.

An example of a case where reading of effective pixels is performed on the upper image area 20a immediately after reading of effective pixels is performed on the lower image area 20b is shown in (a) of FIG. 13. In this case, the V resetting signal is supplied immediately after reading of pixel signals of the 2160th row performed on the lower image area 20b is terminated. Therefore, as shown in (b) of FIG. 13, the count value of the master counter 310 is reset to "0" immediately after the value is counted up to "2160".

Accordingly, as shown (c) of FIG. 13, the reading of AD dummy signals is started immediately after pixel signals in the 2160th row in the lower image area 20b have been read by setting a value in the row "lower AD and block 2" and the column "starting counter" to "0".

Example of Case Where Supply Interval of V Resetting Signal is Bit Larger

Figure 14:
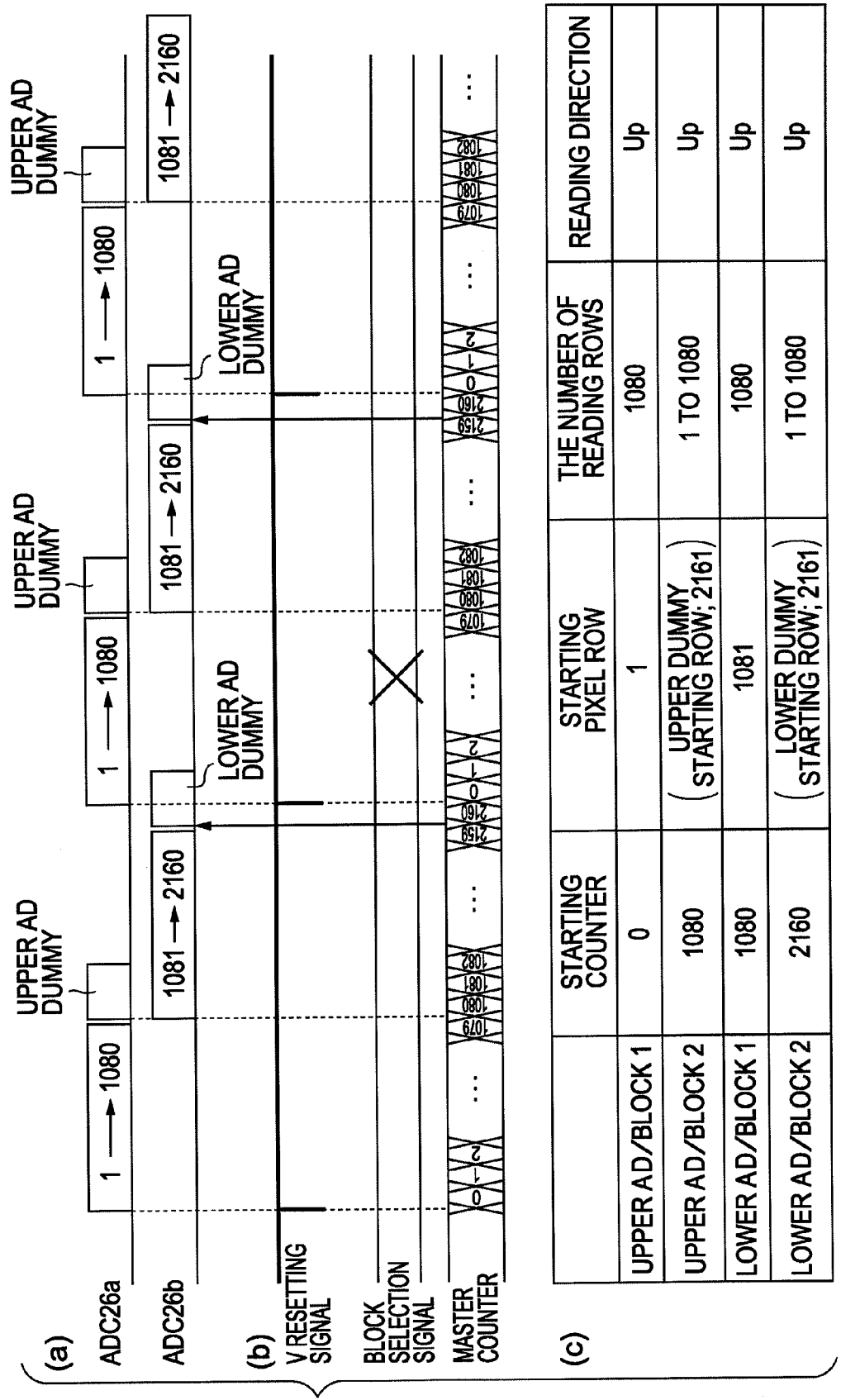
FIG. 14 shows diagrams illustrating the second mode and a setting for reading of the AD dummy signals performed after reading of the effective pixels when the V resetting signals are supplied with slightly larger intervals according to the embodiment of the present invention, wherein (a) of FIG. 14 illustrates a method for reading the image area, (b) of FIG. 14 illustrates the relationship among the V resetting signal, the block selection signal, and the master counter, and (c) of FIG. 14 illustrates a setting of the register.

An example of a case where input interval of the V resetting signal is bit larger, that is, a case where a time interval after the reading of effective pixels in the lower image area 20b is terminated and before the reading of effective pixels in the upper image area 20a is started is bit larger is shown in (a) and (b) of FIG. 14.

In this case, even after reading of pixel signals of the 2160th row in the lower image area 20b is terminated, the master counter 310 continues a count-up operation. Accordingly, a value "2160", for example, is set to a portion corresponding to the row "lower AD and block 2" and the column "starting counter", and thereafter, reading of AD dummy signals is started immediately after the pixel signals of the 2160th row in the lower image area 20b is terminated.

Advantage of Embodiment

According to the foregoing embodiment, the first mode in which pixel signals are read at high speed and the second mode in which pixel signals are read at low speed but the rolling distortion is suppressed are switched from one to another in accordance with the setting value of FPS. That is, one of the two modes having different advantages is selectively used.

Specifically, the first mode is selected when a value larger than 8 P is set to the FPS, and the reading in the image area 20a obtained through the division and the reading in the image area 20b obtained through the division are performed in parallel. Accordingly, pixel signals are read at high speed. Furthermore, when the first mode is selected, exposure timings of the image area 20 is controlled by the rotary shutter 3. Accordingly, the rolling distortion is suppressed.

On the other hand, the second mode is selected when a value equal to or smaller than 8 P is set to the FPS, and driving of the rotary shutter 3 is stopped. Accordingly, the rolling distortion generated owing to the operation of the rotary shutter 3 is suppressed. Moreover, when the second mode is selected, pixel signals included in the image area 20 are read in a normal direction starting from the first row to the last row of the effective pixel region. Accordingly, the rolling distortion is moderately generated.

Furthermore, according to the foregoing embodiment, a process of cancelling fixed pattern noise using the AD dummy signals is performed. Therefore, even when variation among the ADCs included in the column ADC is larger, an appropriate image is obtained.

Moreover, according to the foregoing embodiment, since the number of rows from which AD dummy signals are to be read and a timing when the AD dummy signals are read may be arbitrarily set as setting values of the register. Accordingly, correction suitable for the situation may be performed. For example, in the example shown in FIG. 13 in which a period of time to be used for reading the AD dummy signals is not sufficiently ensured, high-speed processing is attained by reducing the number of rows from which the AD dummy signals are read. Furthermore, in an example shown in FIG. 11 in which a period of time to be used for reading the AD dummy signals is sufficiently ensured, the number of rows from which the AD dummy signals are read is increased to 4000 rows, for example. By this, a process of reducing the fixed pattern noise is performed in a state in which random noise caused by the ADCs 26a or 26b is suppressed.

6. Modification

Note that, in the foregoing embodiment, the processes are performed assuming that levels of the AD dummy signals are fixed. However, the present invention is not limited to this. For example, correction of fixed pattern noise may be performed on more detailed levels by using a plurality of types of AD dummy signals which have different levels.

Furthermore, in the foregoing embodiment, an example in which the fixed pattern noise is reduced using the AD dummy signals is described. However, the present invention is not limited to this. For example, similar processing may be performed using optical black signals. The optical black signals have configurations substantially the same as those of effective pixels. Therefore, if improvement of accuracy of black level correction, for example, is to be prioritized, the optical black signals are preferably used.

Figure 15:
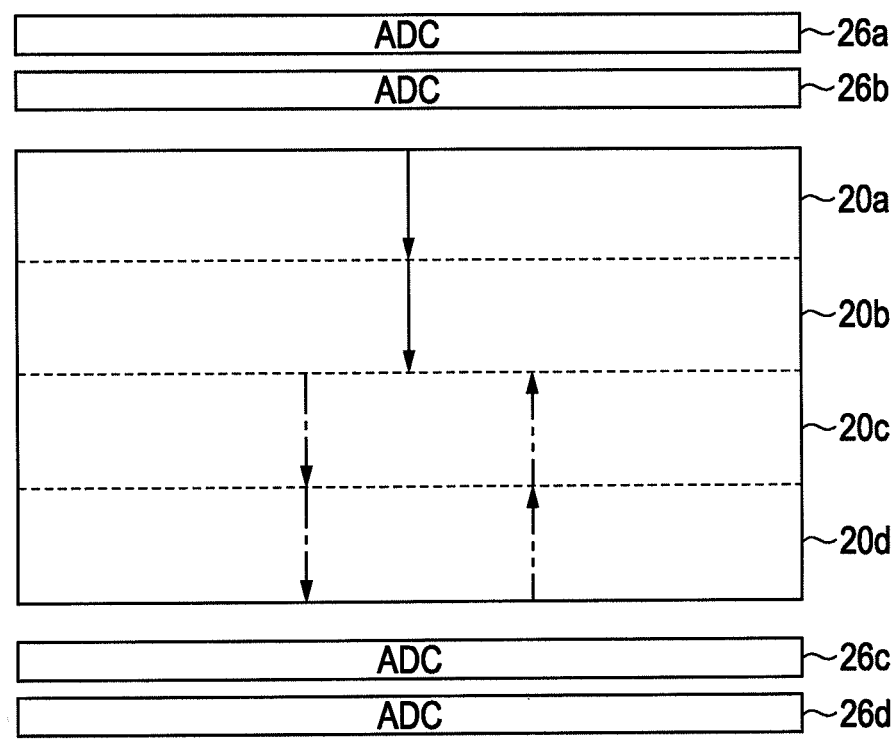
FIG. 15 is a diagram illustrating division of the image area according to a modification of the embodiment of the present invention.

Moreover, in the foregoing embodiment, an example in which the image area 20 is divided into upper and lower regions is described. However, the image area 20 may be divided into left and right regions. Alternatively, as shown in FIG. 15, the image area 20 may be divided into four regions. FIG. 15 is a diagram illustrating a case where the image area 20 is divided into four regions (image areas 20a, 20b, 20c, and 20d) arranged in a vertical direction.

When this configuration is employed, in a first mode, the image areas 20a and 20b are subjected to reading processes from top to bottom, and the image areas 20c and 20d are subjected to reading processes from bottom to top of a screen. In this case, the reading of the image areas 20a and 20b and the reading of the image areas 20c and 20d are performed in parallel.

Furthermore, in a second mode, after the image areas 20a and 20b are subjected to reading from top to bottom of the screen, the image areas 20c and 20d are also subjected to reading from top to bottom.

Alternatively, instead of division of the image area 20 in a horizontal or vertical direction, the image area 20 may be obliquely divided.

The present application contains subject matter related to that disclosed in Japanese Priority Patent Application JP 2009-172384 filed in the Japan Patent Office on Jul. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   a pixel unit which generates pixel signals by performing photoelectric conversion on image light of an object which is entered through a lens and which is divided into at least two regions;
   an image pickup element controller which controls a start of reading of the pixel signals from the pixel unit;
   driving controllers which are disposed so as to correspond to the divided regions in the pixel unit and which controls reading of the pixel signals from the regions;
   a storage unit which stores pixel signals for one screen which have been output from the pixel unit;
   a timing controller which controls a timing when the pixel signals are read from the storage unit in accordance with a setting value of an input frame rate; and
   a timing generator (a) which generates a driving signal used to perform the reading of the pixel signals from one of the regions of the pixel unit and the reading of the pixel signals from the other of the regions in parallel in terms of time when (1) the frame rate is larger than a predetermined threshold value and (2) a mechanical shutter associated with the pixel unit is driven and (b) generates a driving signal used to perform the reading of the pixel signals from one of the regions of the pixel unit and the reading of the pixel signals from the other of the regions in series in terms of time when (1) the frame rate is equal to or smaller than the predetermined threshold value and (2) the mechanical shutter is not driven, and the timing generator which supplies the generated driving signal to the driving controllers.

2. The image pickup apparatus according to claim 1, wherein the timing generator performs instruction so that a direction of the reading of the pixel signals from one of the regions and a direction of the reading of the pixel signals from the other of the regions are the same as each other in terms of physical arrangement using the driving signal generated when the frame rate is equal to or smaller than the predetermined threshold value, 3. The image pickup apparatus according to claim 2, wherein the timing generator performs instruction so that the direction of the reading of the pixel signals from one of the regions and the direction of the reading of the pixel signals from the other of the regions are different from each other using the driving signal generated when the frame rate is larger than the predetermined threshold value.

4. The image pickup apparatus according to claim 3, further comprising:
the mechanical shutter which includes a light-shielding section which blocks incident light transmitted to the pixel unit and a transmission section which allows incident light to he transmitted to the pixel unit; and
a shutter controller which causes the image pickup element controller to start the reading of the pixel signals from the pixel unit when the light-shielding section of the shutter is positioned in front of the pixel unit,
wherein the control of the mechanical shutter performed by the shutter controller is stopped when the frame rate is equal to or smaller than the predetermined threshold value, 5. The image pickup apparatus according to claim 4, further comprising:
a shutter position detector which detects a rotation position of the shutter,
wherein the mechanical shutter having a disk-like shape is driven for rotation by a motor, and
the shutter controller determines whether the light-shielding section is positioned in front of the image pickup element in accordance with information on the rotation position of the shutter detected by the shutter position detector.

6. The image pickup apparatus according to claim 5, farther comprising:
analog/digital convertors which are disposed so as to correspond to pixel columns included in the pixel unit which is divided into the regions, which converts the pixel signals generated in the pixel unit into digital signals, and which generates dummy signals which do not include the pixel signals; and
a signal processor which removes fixed noise pattern by calculating a synchronization addition average of the dummy signals and obtains differences between the synchronization addition average and the pixel signals,
wherein the timing generator generates a driving signal used to read, among the dummy signals, dummy signals from a number of rows specified by a user in a period of time in which the pixel signals are not read.

7. The image pickup apparatus according, to claim 6, wherein the timing generator includes
a counter having a value which is cleared when a vertical resetting signal is input and which is incremented by one every time a horizontal resetting signal is input,
a storage unit which stores a first setting for an operation of reading the effective pixels and a second setting for an operation of reading the dummy signals,
a driving signal generator which generates a driving signal used to specifics a row from which the pixel signals are to be read in accordance with the first setting or the second setting when a value of a starting counter set in the setting of the first setting or the second setting coincides with the count value of the counter, and
a switching unit which outputs a setting selection signal which instructs for selecting the first or second setting and the pixel signals of the regions of the pixel unit which has been divided to the driving signal generator by selecting one of values set as the first and second setting in accordance with a reading method setting signal which instructs parallel reading in terms of time or series reading in terms of time.

8. The image pickup apparatus according to claim 7, wherein each of the first and second settings includes a starting row setting which specifies a row in which the reading of the dummy signals is started, a reading direction setting which specifics a reading direction of the pixel signals or the dummy signals, and a setting of the number of rows subjected to the reading starting from the reading starting, row.

9. The image pickup apparatus according to claim 8, wherein the pixel unit includes an image sensor employing a method for shifting exposure timings from one another performed on one screen in the image area, 10. An image pickup method comprising the steps of:
controlling reading of pixel signals generated from a pixel unit divided into at least two regions, the pixel signals being generated by performing photoelectric conversion on image light of an object which is entered through a lens;
storing pixel signals for one screen which have been output from the pixel unit;
controlling a timing when the stored pixel signals are read in accordance with a setting value of an input frame rate; and
performing control such that (a) the reading of the pixel signals from one of the regions of the pixel unit and the reading of the pixel signals from the other of the regions are performed in parallel in terms of time when (1) the frame rate is larger than a predetermined threshold value and (2) a mechanical shutter with the pixel unit is driven and (b) the reading of the pixel signals from one of the regions of the pixel unit and the reading of the pixel signals from the other of the regions are performed in series in terms of time when (1) the frame rate is equal to or smaller than the predetermined threshold value and (2) the mechanical shutter is not driven.

* * * * *